United States Patent
Kato et al.

(10) Patent No.: US 6,983,540 B2
(45) Date of Patent: Jan. 10, 2006

(54) METHOD FOR MANUFACTURING ELASTIC CYLINDRICAL BODY AND METHOD FOR MANUFACTURING ELASTIC ROLL

(75) Inventors: Shunsuke Kato, Osaka (JP); Mitsuru Tsunokawa, Kyoto (JP); Atsuo Tanaka, Kyoto (JP)

(73) Assignee: Yamauchi Corporation, Osaka (JP)

( * ) Notice: Subject to any disclaimer, the term of this patent is extended or adjusted under 35 U.S.C. 154(b) by 208 days.

(21) Appl. No.: 10/363,531

(22) PCT Filed: Aug. 13, 2001

(86) PCT No.: PCT/JP01/06992

§ 371 (c)(1),
(2), (4) Date: Jun. 23, 2003

(87) PCT Pub. No.: WO02/20237

PCT Pub. Date: Mar. 14, 2002

(65) Prior Publication Data

US 2004/0023767 A1 Feb. 5, 2004

(30) Foreign Application Priority Data

Sep. 5, 2000 (JP) ........................ 2000-268520

(51) Int. Cl.
*B21K 1/02* (2006.01)

(52) U.S. Cl. .................. 29/895.3; 29/527.3; 492/56
(58) Field of Classification Search .............. 29/895, 29/895.21, 895.3, 895.32, 527.3, 527.1; 492/56, 492/59, 48; 264/311, 8, 114, 270
See application file for complete search history.

(56) References Cited

U.S. PATENT DOCUMENTS 5,713,408 A * 2/1998 Morando ................. 164/96

5,836,860 A 11/1998 Watanabe et al.

FOREIGN PATENT DOCUMENTS

| CA | 2069046 A1 | 12/1992 |
|---|---|---|
| CH | 296 748 A | 2/1954 |
| DE | 1 296 786 B | 6/1969 |
| DE | 2 042 179 A1 | 3/1972 |
| EP | 0 533 482 A1 | 3/1993 |
| GB | 2 006 922 A | 5/1979 |
| GB | 2 130 138 A | 5/1984 |
| JP | 37-3481 B1 | 6/1962 |
| JP | 47-15228 B1 | 5/1972 |
| JP | 5-171588 A | 7/1993 |
| JP | 5-208422 A | 8/1993 |
| JP | 8-166011 A | 6/1996 |
| JP | 11-129264 A | 5/1999 |

* cited by examiner

*Primary Examiner*—Marc Jimenez
(74) *Attorney, Agent, or Firm*—Birch, Stewart, Kolasch & Birch, LLP

(57) ABSTRACT

A liquid mixture containing a liquid polymeric material and a granular filler is injected into a mold (11) for centrifugal molding and subjected to centrifugal molding, thereby preparing a cylindrical body including a homogeneous dispersion layer (2) having the filler homogeneously dispersed in the polymeric material and a high-density packed bed (1), formed on the outer peripheral surface side or on the inner peripheral surface side of the homogeneous dispersion layer (2), containing the aforementioned polymeric material more densely filled with the aforementioned filler. The high-density packed bed (1) is removed for exposing the surface of the homogeneous dispersion layer (2). According to this structure, the yield of the elastic cylindrical body can be improved.

12 Claims, 13 Drawing Sheets

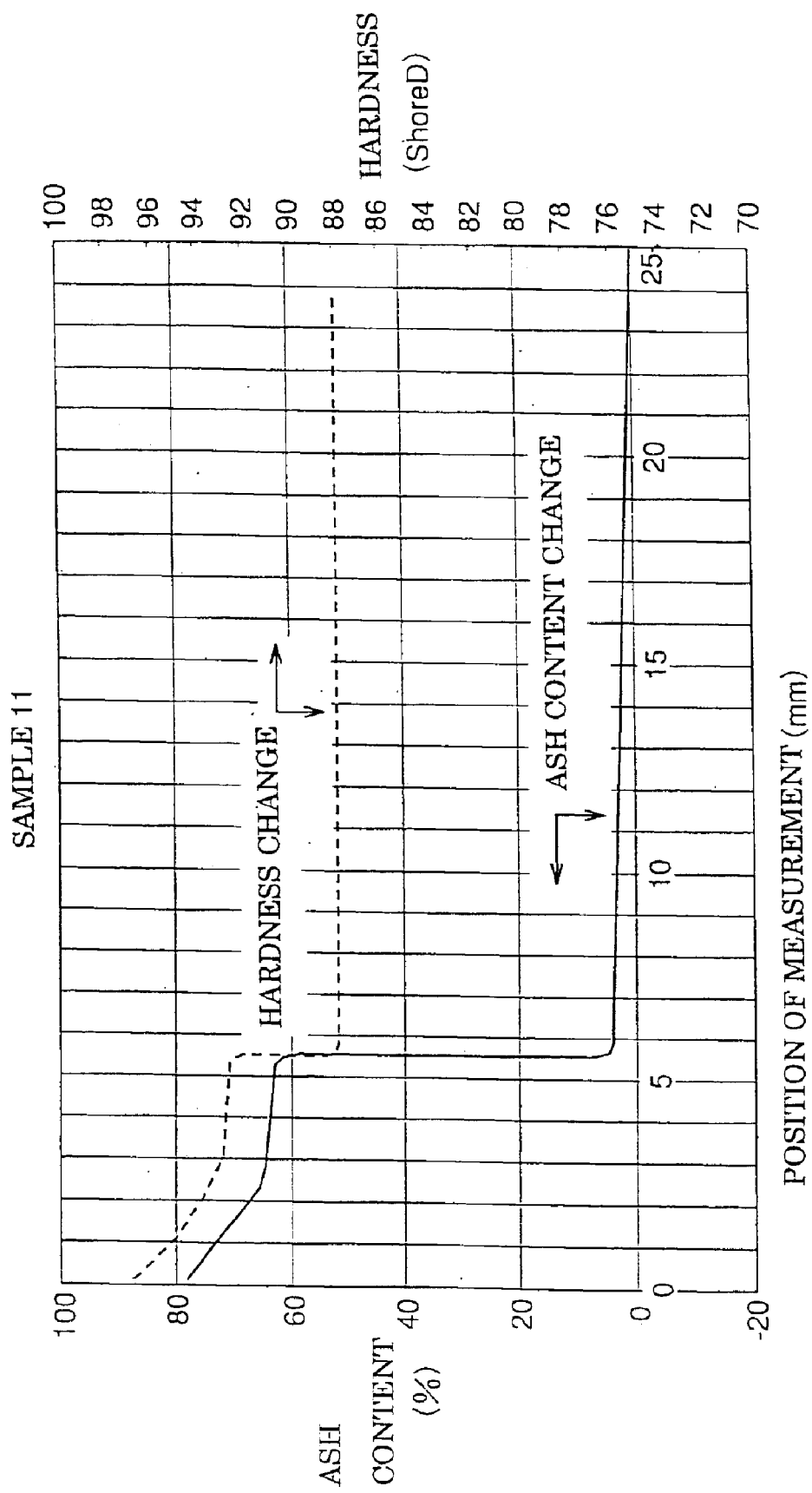

METHOD FOR MANUFACTURING ELASTIC CYLINDRICAL BODY AND METHOD FOR MANUFACTURING ELASTIC ROLL

This application is the national phase under 35 U.S.C. § 371 of PCT International Application No. PCT/JP01/06992 which has an International filing date of Aug. 13, 2001, which designated the United States of America.

TECHNICAL FIELD

The present invention generally relates to a method of manufacturing an elastic cylindrical body and a method of manufacturing an elastic roll, and more specifically, it relates to a method of manufacturing an elastic cylindrical body including no voids therein and having excellent mechanical strength and a method of manufacturing an elastic roll.

The present invention also relates to an elastic cylindrical body and an elastic roll used in various types of industries such as the paper industry, the iron industry, the film industry, the textile industry and the like, and more specifically, it relates to a large-sized and hard elastic roll used as a paper calender roll, a paper press roll, a fiber calender roll or a calender roll for a magnetic recording medium and an elastic cylindrical body used as an elastic covering layer therefor.

BACKGROUND ART

Japanese Patent Publication No. 3-47359 discloses a method of manufacturing a conventional hard roll employing cast molding.

First, a fibrous material impregnated with thermosetting resin is wound on the outer peripheral surface of a metal roll core for forming a fiber-reinforced under winding layer.

Separately from the aforementioned step, a thermosetting synthetic resin material containing a filler is cast into a cylinder forming mold of a prescribed size and hardened at a prescribed temperature for forming an outer layer cylinder.

The metal roll core having the fiber-reinforced under winding layer is covered with the outer layer cylinder, and an adhesive having low viscosity is cast into an annular clearance defined between the under winding layer and the cylinder and hardened at a prescribed temperature, for joining and integrating the under winding layer and the cylinder with each other through an adhesive layer.

The aforementioned cylinder forming mold is vertically fixed.

The conventional method of manufacturing a hard roll has the following problems: While the outer surface and the inner surface of the formed cylinder are cut for attaining cylindricity, the surface of the formed cylinder is waved in the case of a large-sized roll used in the paper industry, and hence a large cutting margin must be provided in consideration of allowance. Therefore, the yield is disadvantageously deteriorated.

Further, it is difficult to remove voids when forming the outer layer cylinder.

In addition, bad influence is exerted on the quality of an objective product processed with the elastic roll when voids appear on the surface of the cylinder.

When the outer layer cylinder includes voids therein, stress concentration takes place in portions having the voids, and the elastic roll may be broken.

On the other hand, each of Japanese Patent Laying-Open No. 8-166011, Japanese Patent Publication No. 62-40476, Japanese Patent Publication No. 48-37337 and Japanese Patent Laying-Open No. 56-4419 discloses a conventional method of forming a cylindrical body by centrifugal molding. It is known that voids can be effectively removed by centrifugation and a cylindrical body also excellent in cylindricity can be formed according to such centrifugal molding.

Every conventional method of forming a cylindrical body by centrifugal molding concentrates a filler to a desired position through centrifugation.

Such centrifugal molding has the following problems: In general, a reinforcing filler has such large specific gravity that the filler tends to concentrate to the outer surface side when subjected to centrifugal molding.

When the filler concentrates to the outer surface side, the hardness of the cylindrical body is increased on the surface and reduced toward the inner diameter side. Further, no homogeneous physical property can be attained in the thickness direction.

Therefore, the hardness or the physical property varies as the cylindrical body is cut or ground, and it is difficult to finish a roll defined in size to desired hardness or a desired physical property.

When the filler concentrates to the outer surface side, further, the filler is heterogeneously dispersed in the radial direction. In a roll rotating at a high speed with application of a load in a used state, therefore, a portion containing a small amount of filler disadvantageously tends to locally cause internal heat build-up when an inorganic filler is employed. When such internal heat build-up progresses, the roll may be broken.

DISCLOSURE OF THE INVENTION

The present invention has been proposed in order to solve the aforementioned problems, and an object thereof is to provide a method of manufacturing an elastic cylindrical body and a method of manufacturing an elastic roll improved to be capable of improving the yield.

Another object of the present invention is to provide a method of manufacturing an elastic cylindrical body and a method of manufacturing an elastic roll improved to be capable of removing voids and stabilizing a physical property such as hardness.

Still another object of the present invention is to provide a method of manufacturing an elastic cylindrical body and a method of manufacturing an elastic roll improved to be capable of preventing local stress concentration or internal heat build-up and improving durability.

A further object of the present invention is to provide an elastic cylindrical body and an elastic roll manufactured by such methods.

BRIEF DESCRIPTION OF THE DRAWINGS

FIG. 14 illustrates the relation between a position of measurement for a sample 11 and an ash content as well as hardness.

BEST MODE FOR CARRYING OUT THE INVENTION

Figure 1:
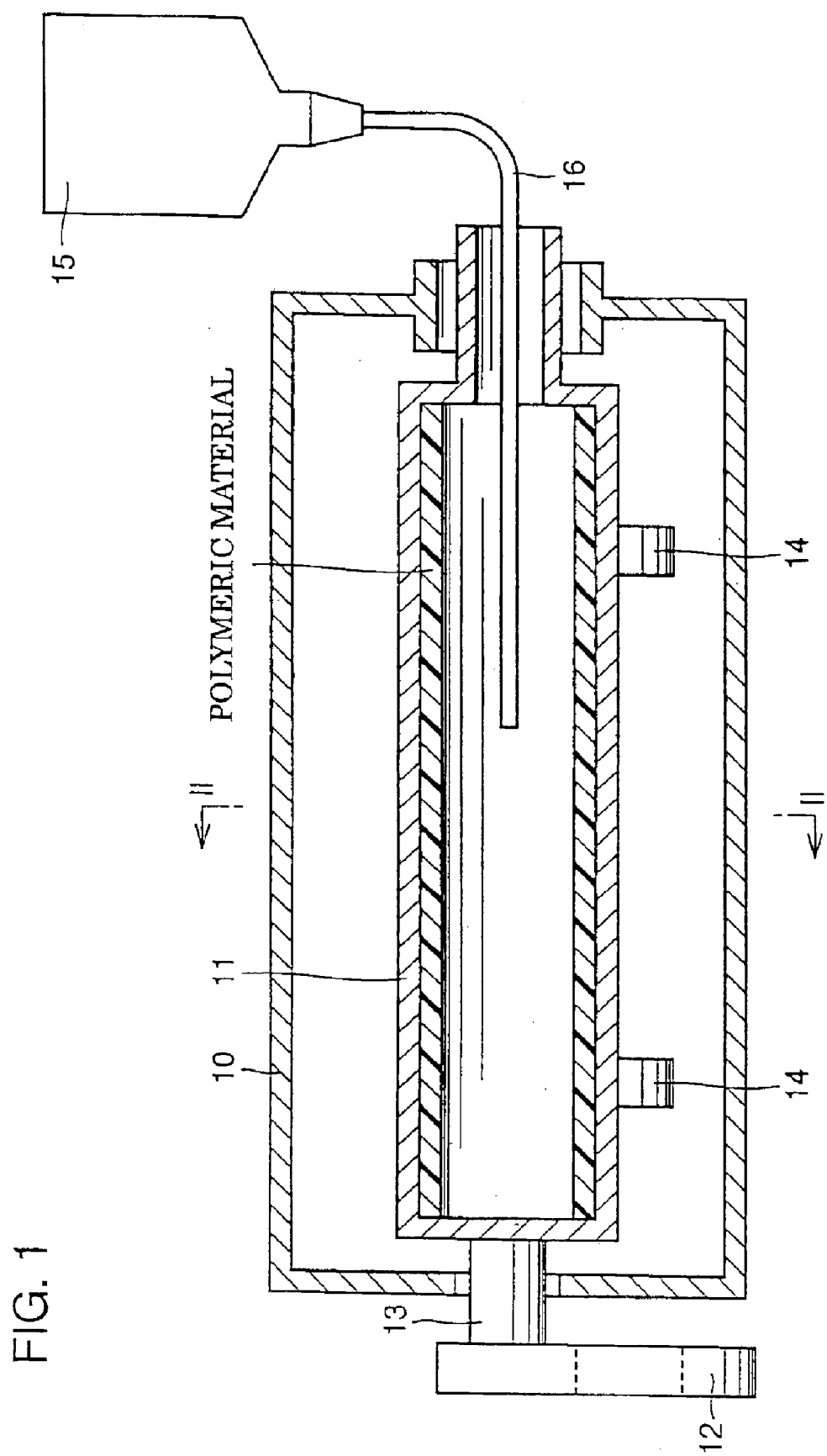
FIG. 1 is a sectional view of a centrifugal molding apparatus used in the present invention.

A method of manufacturing an elastic cylindrical body, a method of manufacturing an elastic roll, an elastic cylindrical body and an elastic roll according to the present invention are now described with reference to drawings showing embodiments thereof.

The present invention has been proposed by noting that a layer containing a filler densely concentrating on an outer surface portion is formed while a layer containing the filler in a substantially homogeneously dispersed state is formed in the remaining portion when an elastic material is completely hardened under a certain condition in a centrifugal molding step of manufacturing a cylindrical body from a liquid mixture containing a liquid polymeric material and the filler by centrifugal molding.

It has been found that voids can be substantially completely removed while it is possible to substantially homogeneously disperse the filler on the whole excluding a small high-density packed bed on an outer surface potion or an inner surface portion of the elastic cylindrical body by performing centrifugal molding under a specific condition. The present invention has been proposed by finding means of obtaining an elastic cylindrical body containing a filler substantially homogeneously dispersed on the whole by removing this high-density packed bed.

Further, the present invention has been proposed by finding that voids can be substantially completely removed and an elastic cylindrical body containing a filler substantially homogeneously dispersed on the whole can be obtained while converting a high-density packed bed to an extremely small skin layer or forming no high-density packed bed by performing centrifugal molding under a limited condition.

In a method of manufacturing an elastic cylindrical body according to a first aspect of the present invention, a liquid mixture containing a liquid polymeric material and a filler is first cast into a mold for centrifugal molding and subjected to centrifugal molding, thereby preparing a cylindrical body including a homogenous dispersion layer containing the filler homogeneously dispersed in the polymeric material and a high-density packed bed, formed on the outer peripheral surface side or on the inner peripheral surface side of the homogeneous dispersion layer, containing the polymeric material more densely filled with the filler.

The aforementioned high-density packed bed is removed for exposing the homogeneous dispersion layer on the surface.

According to the present invention, the high-density packed bed is formed on the outer peripheral surface side of the homogeneous dispersion layer when the specific gravity of the filler is larger than the specific gravity of the liquid polymeric material. When the specific gravity of the filler is smaller than the specific gravity of the liquid polymeric material, on the other hand, the high-density packed bed is formed on the inner peripheral surface side of the homogeneous dispersion layer.

Further, cylindricity is improved by performing centrifugal molding. Consequently, a cutting margin can be reduced for improving the yield.

In addition, voids having small specific gravity can be discharged toward the inner peripheral surface side by performing centrifugal molding, thereby removing the voids.

An elastic cylindrical body containing the filler substantially homogeneously dispersed on the whole can be obtained by removing the high-density packed bed.

Also when the elastic cylindrical body rotates at a high speed with application of a load in a used state, local internal heat build-up hardly takes place and durability is improved.

When the high-density packed bed is formed on the outer peripheral surface side, the homogeneous dispersion layer may be exposed on the surface by removing the high-density packed bed so that the surface hardness is not further reduced even if the outer surface portion is cut. Consequently, a physical property such as hardness can be readily set.

In a method of manufacturing an elastic cylindrical body according to a second aspect of the present invention, the thickness of the aforementioned high-density packed bed is not more than 15% (not including 0%) of the thickness of the cylindrical body.

According to the present invention, the yield is improved.

According to a more preferred embodiment of the present invention, the thickness of the high-density packed bed is not more than 2% of the thickness of the overall cylindrical body.

In a method of manufacturing an elastic cylindrical body according to a third aspect of the present invention, the aforementioned removing step removes the outer peripheral surface or the inner peripheral surface of the cylindrical body at least by a thickness corresponding to Z expressed in the following equation [1]:

$$Z = 1.1 \times Y \quad [1]$$

$$Y = 6.1 \times 10^{-7} \int_{t_0}^{t_{gp}} \frac{D_P^2 (\rho_P - \rho) r N_t^2}{\mu_t} dt \quad [2]$$

(in the above equations, t0=0, tgp (s) represents the time required for gelation of the liquid mixture, Dp (mm) represents the 80 cumulative weight % particle diameter of the filler, ρp represents the specific gravity of the filler,
ρ represents the specific gravity of the liquid polymeric material,
r (mm) represents the inner radius of the cylindrical body,
Nt (rpm) represents the rotational frequency of the mold at a time t in the centrifugal molding step, and
μt (Pa·s) represents the viscosity of the liquid polymeric material at the time t upon heating under the same condition as the centrifugal molding respectively).

The thickness of the high-density packed bed is conceivably closely related to the migration length of the filler resulting from centrifugal molding.

A general formula for obtaining the traveling speed of bubbles or particles during centrifugal molding is known and described in "Plastic Processing Technology Handbook" pp. 604 to 606 (1969, edited by Plastic Processing Technology Handbook Editorial Committee) or "Method of Chemical Calculation Series 4, Method of Calculation in Chemical Engineering" pp. 180 to 183 (1999, issued by Tokyo Denki University), for example. With reference to such known literature, it has been found that the migration length of the filler resulting from centrifugal molding can be approximated with Y shown in the equation [2] in consideration of that the rotational frequency of the mold is changed during centrifugal molding, the viscosity is increased as the liquid polymeric material is hardened and the like.

When manufacturing an elastic cylindrical body in practice, a cylindrical body containing a filler substantially homogeneously dispersed on the whole can be obtained by removing a high-density packed bed at least by a thickness corresponding to 1.1×Y in consideration of an error in molding etc.

If the amount for removing the high-density packed bed is smaller than the thickness corresponding to Z, there is unpreferably a possibility that a layer densely filled with the filler remains in the finished elastic cylindrical body and no cylindrical body containing the filler substantially homogeneously dispersed on the whole cannot be obtained.

On the other hand, it is non-economic if the amount for removing the outer peripheral surface or the inner peripheral surface of the cylindrical body is excessive beyond necessity, and hence the amount of removal is preferably set as small as possible.

In the present invention, the rotational frequency Nt of centrifugal molding may be regularly kept constant, or may be changed in an intermediate stage. When the rotational frequency Nt of the mold is changed during centrifugal molding, the rotational frequency can be stepwisely or continuously changed.

The values of the respective variables are generally within the following ranges:

tgp: 60 s to 100,000 s

In the present invention, it is assumed that the time up to gelation of the liquid mixture is a gel point obtained from a critical point of a viscosity-time line diagram.

Dp: $1 \times 10^{-5}$ mm to $5 \times 10^{-2}$ mm

The 80 cumulative weight % particle diameter indicates the particle diameter of particles corresponding to 80 weight % accumulated from particles having smaller particle sizes when measuring particle size distribution. In other words, it means that particles of not more than this particle diameter occupy 80 weight % of all particles.

In the present invention, a granular filler is preferably employed.

ρp: 0.03 to 5.3
ρ: 0.8 to 2.6
r: 50 mm to 750 mm

Nt: 100 rpm to 2000 rpm

μt represents the viscosity of a medium. While actual centrifugal molding is performed on the liquid mixture of the liquid polymeric material and the filler, the filler is excluded from the liquid mixture in the medium when considering movement of the filler in the liquid mixture. Therefore, μt is assumed to be the viscosity of the liquid polymeric material at the time t upon heating under the same condition as this centrifugal molding.

A method of manufacturing an elastic cylindrical body according to a fourth aspect of the present invention performs the aforementioned centrifugal molding under conditions satisfying the following equations [3] and [4]:

$$X \geq T \quad [3]$$

$$Y \leq T/4 \quad [4]$$

where $$X = 2.3 \times 10^{-7} \int_{t_0}^{t_{gp}} \frac{0.2^2 \rho_m R N_t^2}{\eta_t} \, dt \quad [5]$$

$$Y = 6.1 \times 10^{-7} \int_{t_0}^{t_{gp}} \frac{D_P^2 (\rho_P - \rho) r N_t^2}{\mu_t} \, dt \quad [6]$$

(in the above equations, T (mm) represents the thickness of the cylindrical body,
t0=0,
tgp (s) represents the time required for gelation of the liquid mixture,
ρm represents the specific gravity of the liquid mixture,
R (mm) represents the inner radius of the mold,
Nt (rpm) represents the rotational frequency of the mold at a time t in the centrifugal molding step,
ηt (Pa·s) represents the viscosity of the liquid mixture at the time t,
Dp (mm) represents the 80 cumulative weight % particle diameter of the filler,
ρp represents the specific gravity of the filler,
ρ represents the specific gravity of the liquid polymeric material,
r (mm) represents the inner radius of the cylindrical body, and
μt (Pa·s) represents the viscosity of the liquid polymeric material at the time t upon heating under the same condition as the centrifugal molding respectively).

The present invention defines preferable conditions for centrifugal molding.

It is possible to manufacture a cylindrical body containing no voids in the hardened cylindrical body and having a thin high-density packed bed to be removed by satisfying the above equations [3] and [4].

The equation [3] shows a condition for discharging voids of at least 0.2 mm in diameter from the cylindrical body by centrifugal molding. The voids of at least 0.2 mm are noted since the function of an objective product of the present invention may be damaged if the product contains voids of at least 0.2 mm.

Similarly to the case of the equation [2], it has been found with reference to the known general formula for obtaining the traveling speed of bubbles in centrifugal molding that the distance of radial movement of voids of 0.2 mm in diameter resulting from centrifugal molding can be approximated with X.

Voids can be substantially completely removed from the cylindrical body before gelation of the liquid mixture by satisfying X≧T.

The equation [4] shows a condition for reducing the high-density packed bed to a preferable thickness in the cylindrical body prepared through the centrifugal molding step.

The distance of radial movement of the filler resulting from centrifugal molding can conceivably be approximated with Y as described above in theory.

As a result of an experiment, it has been possible to reduce the thickness of the high-density packed bed required to be removed in the removing step to not more than 15% of the thickness of the cylindrical body prepared through the centrifugal molding step by setting $Y \leq T/4$. Thus, the yield is improve by this means.

More preferably, $Y \leq T/10$, and more preferably, $Y \leq T/20$. In either case, it has been possible to reduce the thickness of the high-density packed bed to not more than 10% of the thickness of the cylindrical body.

The thickness T of the cylindrical body prepared through the centrifugal molding step is generally about 5 mm to 50 mm.

Values generally employable for the respective variables related to Y are as described above.

The variables related to X other than the above are generally in the following ranges:

$\rho m$: 0.5 to 5

R: 55 mm to 755 mm

The rotational frequency Nt of the mold may remain constant throughout the centrifugal molding step within a range satisfying the aforementioned condition, or may be stepwisely or continuously changed in an intermediate stage.

The liquid mixture is preferably previously defoamed before the same is cast into the mold, so that voids can be more reliably removed.

A method of manufacturing an elastic cylindrical body according to a fifth aspect of the present invention relates to a method of casting a liquid mixture containing a liquid polymeric material and a filler into a mold for centrifugal molding and performing centrifugal molding thereby preparing a cylindrical body having the filler dispersed in the polymeric material.

The aforementioned centrifugal molding is performed under conditions satisfying the following equations [7] and [8]:

$$X \geq T \quad [7]$$

$$Y \leq T/100 \quad [8]$$

where $$X = 2.3 \times 10^{-7} \int_{t_0}^{t_{gp}} \frac{0.2^2 \rho_m R N_t^2}{\eta_t} dt \quad [9]$$

$$Y = 6.1 \times 10^{-7} \int_{t_0}^{t_{gp}} \frac{D_P^2 (\rho_P - \rho) r N_t^2}{\mu_t} dt \quad [10]$$

(in the above equations, T (mm) represents the thickness of the cylindrical body, t0=0, tgp (s) represents the time required for gelation of the liquid mixture, ρm represents the specific gravity of the liquid mixture, R (mm) represents the inner radius of the mold, Nt (rpm) represents the rotational frequency of the mold at a time t in the centrifugal molding step, ηt (Pa·s) represents the viscosity of the liquid mixture at the time t, Dp (mm) represents the 80 cumulative weight % particle diameter of the filler, ρp represents the specific gravity of the filler, ρ represents the specific gravity of the liquid polymeric material, r (mm) represents the inner radius of the cylindrical body, and μt (Pa·s) represents the viscosity of the liquid polymeric material at the time t upon heating under the same condition as the centrifugal molding respectively.)

The present invention defines particularly preferable conditions for centrifugal molding.

When the above equations [7] and [8] are satisfied, voids can be substantially completely removed and an elastic cylindrical body containing a filler substantially homogeneously dispersed on the whole can be obtained while converting a high-density packed bed to an extremely small skin layer or forming no high-density packed bed.

When a skin layer is formed, the same is removed by a known method such as cutting or blasting.

When no high-density packed bed is formed, the aforementioned removing step is not necessarily required. Also in this case, however, it is preferable to perform surface working such as cutting or blasting.

When $X \geq T$ is satisfied, voids can be substantially completely removed from the cylindrical body before gelation of the liquid mixture.

When $Y \leq T/100$ is satisfied, an elastic cylindrical body containing a filler substantially homogeneously dispersed on the whole can be obtained while converting a high-density packed bed to an extremely small skin layer or forming no high-density packed bed.

When $Y \leq T/100$, the thickness of the high-density packed bed can be reduced to not more than 2% of the thickness of the cylindrical body.

In a method of manufacturing an elastic cylindrical body according to a sixth aspect of the present invention, the 80 cumulative weight % particle diameter [DP] of the aforementioned filler is within the range of 0.01 $\mu$m to 20 $\mu$m.

According to the present invention, voids can be removed and the thickness of the high-density packed bed can be reduced according to the aforementioned condition.

If the 80 cumulative weight % particle diameter of the filler is smaller than 0.01 $\mu$m, there is a possibility that the viscosity of the liquid mixture prepared by mixing the filler of a prescribed ratio into the liquid polymeric material is so excessively increased that it is difficult to remove voids by centrifugal molding.

If the 80 cumulative weight % particle diameter of the filler is larger than 20 $\mu$m, the filler readily radially moves by centrifugal force upon centrifugal molding. Consequently, the thickness of the high-density packed bed is not reduced but the amount to be removed in the removing step is increased, and hence the yield is deteriorated.

A particularly preferable range for the 80 cumulative weight % particle diameter of the filler is at least 1.0 $\mu$m and not more than 5.0 $\mu$m.

A filler having a 80 cumulative weight % particle diameter of at least 1.0 $\mu$m is easy to obtain. When the 80% cumulative weight % particle diameter is set to not more than 5.0 $\mu$m, the thickness of the high-density packed bed can be particularly reduced.

It is preferable to use a filler having minimum dispersion of particle sizes since particles are more homogeneously dispersed in the homogeneous dispersion layer.

In a method of manufacturing an elastic cylindrical body according to a seventh aspect of the present invention, the aforementioned centrifugal molding step at least includes a step A of removing voids from the liquid polymeric material and a step B of hardening the liquid polymeric material while suppressing radial movement of the filler.

According to the present invention, both of removal of voids and reduction of the thickness of the high-density packed bed can be readily attained.

The steps A and B can be distinguished from each other by changing the rotational frequency, the temperature, the air pressure etc. in the centrifugal molding step.

A method of manufacturing an elastic cylindrical body according to an eighth aspect of the present invention carries out the aforementioned step B with lower-speed rotation than the aforementioned step A.

In order to reduce the thickness of the high-density packed bed, radial movement of the filler must be suppressed to the minimum throughout the centrifugal molding step.

After removing voids in the step A, therefore, it is preferable to harden the polymeric material while reducing the rotational frequency within a range capable of maintaining the centrifugal force in the step B. Thus, both of removal of voids and reduction of the thickness of the high-density packed bed can be readily attained.

When changing the rotational frequency of the mold during the centrifugal molding step, the rotational frequency may be changed to a prescribed level stepwise.

When changing the rotational frequency of the mold during the centrifugal molding step, the rotational frequency of the mold may be continuously changed.

A method of manufacturing an elastic cylindrical body according to a ninth aspect of the present invention keeps the rotational frequency of the mold constant throughout the aforementioned centrifugal molding step.

According to the present invention, the rotational frequency of the mold may not be changed but kept constant throughout the centrifugal molding step. Depending on the way of selecting the liquid polymeric material, the filler, the composition of the liquid mixture, the temperature condition, the rotational frequency of the mold etc., it is possible to attain both of removal of voids and reduction of the thickness of the high-density packed bed also when keeping the rotational frequency of the mold constant throughout the centrifugal molding step. In this case, the manufacturing steps can be simplified.

In a method of manufacturing an elastic roll according to a tenth aspect of the present invention, a liquid mixture containing a liquid polymeric material and a filler is cast into a mold for centrifugal molding and subjected to centrifugal molding thereby preparing a cylindrical body including a homogeneous dispersion layer containing the filler homogeneously dispersed in the polymeric material and a high-density packed bed, formed on the outer peripheral surface side or on the inner peripheral surface side of the homogeneous dispersion layer, containing the polymeric material more densely filled with the filler. The aforementioned high-density packed bed is removed for exposing the homogeneous dispersion layer on the surface. The aforementioned cylindrical body is put on the outer side of a core before the aforementioned removing step or after the removing step for integrating the cylindrical body and the core with each other.

While the removing step must be carried out before the step of integrating the cylindrical body and the core with each other when the high-density packed bed is formed on the inner peripheral surface side of the cylindrical body, either one of the removing step and the step of integrating the cylindrical body and the core with each other may be precedently carried out when the high-density packed bed is formed on the outer peripheral surface side of the cylindrical body.

Surface working such as cutting or blasting is performed at need on the inner peripheral surface of the cylindrical body before the same is integrated with the core or on the outer peripheral surface of the cylindrical body before or after the same is integrated with the core, for attaining desired dimensional accuracy and surface accuracy. This surface working may include the removing step.

In a method of manufacturing an elastic roll according to an eleventh aspect of the present invention, a liquid mixture containing a liquid polymeric material and a filler is cast into a mold for centrifugal molding and subjected to centrifugal molding thereby preparing a cylindrical body having the filler dispersed in the polymeric material. The aforementioned cylindrical body is put on the outer side of a core for integrating the cylindrical body and the core with each other.

The centrifugal molding is performed under conditions satisfying the following equations [11] and [12]:

$$X \geq T \quad [11]$$

$$Y \leq T/100 \quad [12]$$

where $$X = 2.3 \times 10^{-7} \int_{t_0}^{t_{gp}} \frac{0.2^2 \rho_m R N_t^2}{\eta_t} dt \quad [13]$$

$$Y = 6.1 \times 10^{-7} \int_{t_0}^{t_{gp}} \frac{D_P^2 (\rho_P - \rho) r N_t^2}{\mu_t} dt \quad [14]$$

(in the above equations, T (mm) represents the thickness of the cylindrical body, t0=0, tgp (s) represents the time required for gelation of the liquid mixture, ρm represents the specific gravity of the liquid mixture, R (mm) represents the inner radius of the mold, Nt (rpm) represents the rotational frequency of the mold at a time t in the centrifugal molding step, ηt (Pa·s) represents the viscosity of the liquid mixture at the time t, Dp (mm) represents the 80 cumulative weight % particle diameter of the filler, ρp represents the specific gravity of the filler, ρ represents the specific gravity of the liquid polymeric material, r (mm) represents the inner radius of the cylindrical body, and μt (Pa·s) represents the viscosity of the liquid polymeric material at the time t upon heating under the same condition as the centrifugal molding).

When the cylindrical body is centrifugally molded under these conditions as hereinabove described, voids can be substantially completely removed and an elastic cylindrical body containing a filler substantially homogeneously dispersed on the whole can be obtained while converting a high-density packed bed to an extremely small skin layer or forming no high-density packed bed.

When a skin layer is formed, the same is removed by a known method such as cutting or blasting. While the skin layer must be removed before the step of integrating the cylindrical body and the core with each other when the same is formed on the inner peripheral surface of the cylindrical body, either one of the step of removing the skin layer and the step of integrating the cylindrical body and the core with each other may be precedently carried out when the skin layer is formed on the outer peripheral surface side of the cylindrical body.

When no high-density packed bed is formed, the removing step is not necessarily required. Also in this case, however, it is preferable to perform surface working such as cutting or blasting for attaining prescribed dimensional accuracy and surface accuracy.

In a method of manufacturing an elastic roll according to a twelfth aspect of the present invention, the aforementioned elastic roll is a paper calender roll.

The manufacturing method according to the present invention is particularly effective when applied to manufacturing of a large-sized roll, particularly a paper calender roll.

An elastic cylindrical body according to a thirteenth aspect of the present invention relates to an elastic cylindrical body, containing a polymeric material and a filler, obtained by centrifugal molding. The difference between the hardness of the outer surface and the hardness of the inner surface is within 2 degrees (JIS D), and the difference in hardness per millimeter in the thickness direction is within 1 degree (JIS D). The 80 cumulative weight % particle diameter of the filler [Dp] ranges from 0.01 $\mu$m to 20 $\mu$m.

According to the present invention, the hardness is not reduced also when cutting or polishing is performed. The elastic cylindrical body includes no voids on the surface and in the inner part.

The elastic cylindrical body according to the present invention can be worked into an elastic roll excellent in surface characteristic, capable of avoiding breakage resulting from local stress concentration or internal heat build-up and having stable hardness when the cylindrical body is put on the outer side of a core and integrated with the core.

More preferably, the difference between the hardness of the outer surface and the hardness of the inner surface is within 1 degree, and the difference in hardness per millimeter in the thickness direction is 0 degree.

An elastic cylindrical body according to a fourteenth aspect of the present invention relates to an elastic cylindrical body, containing a polymeric material and a filler, obtained by centrifugal molding. The difference between the ash content on the outer peripheral portion and the ash content on the inner surface portion is within 20%, and the difference in ash content per millimeter in the thickness direction is within 10%. According to the present invention, the elastic cylindrical body includes no voids on the surface and in the inner part.

According to a more preferred embodiment of the present invention, the difference between the ash content on the outer surface portion and the ash content on the inner surface portion is within 10%, and the difference in ash content per millimeter in the thickness direction is within 0.5%. The 80 cumulative weight % particle diameter of the filler [Dp] ranges from 0.01 $\mu$m to 20 $\mu$m.

An elastic roll according to a fifteenth aspect of the present invention relates to an elastic roll including a core and an elastic cylindrical body located on the outer side of the core and integrated with the core.

The elastic cylindrical body is an elastic cylindrical body, containing a polymeric material and a filler, obtained by centrifugal molding. The difference between the hardness on the outer surface and the hardness on the inner surface is within 2 degrees (JIS D), and the difference in hardness per millimeter in the thickness direction is within 1 degree (JIS D). The 80 cumulative weight % particle diameter of the filler [Dp] ranges from 0.01 $\mu$m to 20 $\mu$m. According to the present invention, the elastic roll includes no voids on the surface and in the inner part.

An elastic roll according to a sixteenth aspect of the present invention relates to an elastic roll including a core and an elastic cylindrical body located on the outer side of the core and integrated with the core. The elastic cylindrical body is an elastic cylindrical body, containing a polymeric material and a filler, obtained by centrifugal molding. The difference between the ash content on the outer surface portion and the ash content on the inner surface portion is within 20%, and the difference in ash content per millimeter in the thickness direction is within 10%. The 80 cumulative weight % particle diameter of the filler [Dp] ranges from 0.01 $\mu$m to 20 $\mu$m. According to the present invention, the elastic roll includes no voids on the surface and in the inner part.

In an elastic roll according to a seventeenth aspect of the present invention, the aforementioned elastic roll is a paper calender roll.

Epoxy resin, polyurethane, polyisocyanurate, cross-linked polyester amide, unsaturated polyester, diallyl phthalate resin or the like can be listed as the polymeric material used in the present invention. Among these, epoxy resin and cross-linked polyester amide are preferable in consideration of durability, heat resistance and easy molding, and particularly employment of epoxy resin is preferable.

A generally used granular filler such as carbon black, silica, alumina, titanium oxide, aluminum hydroxide, calcium carbonate, clay, barium sulfate, zinc oxide, magnesium hydroxide, a glass bead, a resin bead or the like can be listed as the filler used in the present invention.

Two or more types of fillers may be combined with each other.

The mixing ratio of the filler is about 10 to 60 weight % in the overall liquid mixture.

A pigment, a plasticizer etc. may be properly blended in addition to the aforementioned filler.

Figure 2:
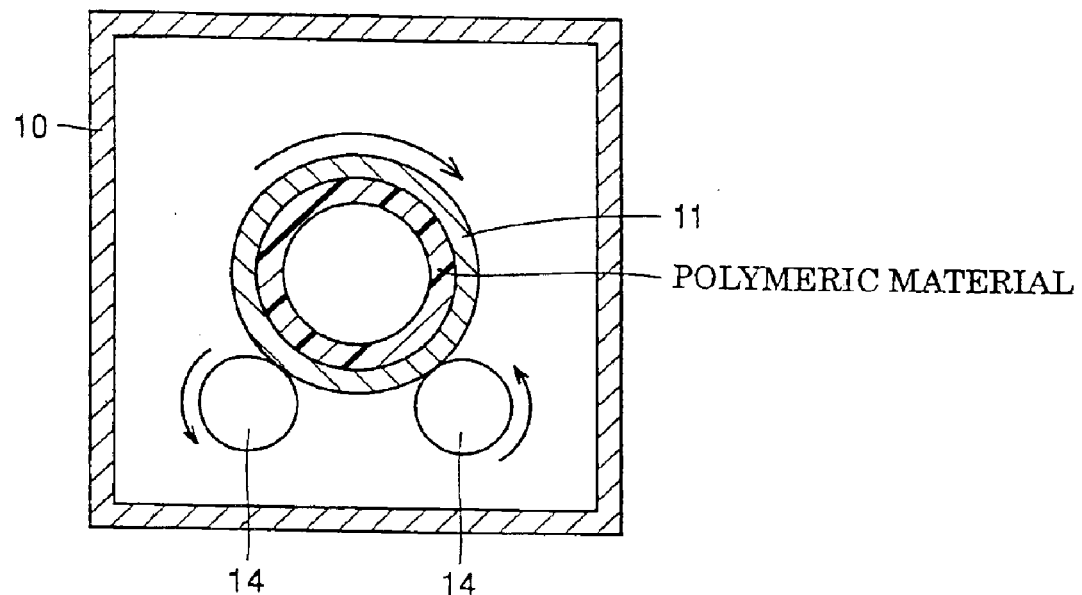
FIG. 2 is a sectional view taken along the line II—II in FIG. 1.

FIG. 1 is a sectional view of a centrifugal molding apparatus employed in the present invention, and FIG. 2 is a sectional view taken along the line II—II in FIG. 1. As shown in FIGS. 1 and 2, a cylindrical mold 11 having prescribed dimensions is arranged in a chamber 10 so that the axis thereof extends along the horizontal direction. An end of the mold 11 is coupled with an external driving mechanism (a driving part 12 and a driving shaft 13), so that the mold 11 can be rotated about the axis at a prescribed rotational frequency. A plurality of support rollers 14 support the lower portion of the mold 11. A casting tube 16 extends into the mold 11 from an external casting machine 15. The internal temperature of the chamber 10 can be managed to be capable of heating and hardening a liquid polymeric material.

A procedure of centrifugal molding is now described.

The liquid polymeric material, a filler and other compounding agents added at desire are mixed with each other and stirred for preparing a liquid mixture containing the liquid polymeric material and the filler.

The mold 11 heated to a prescribed temperature is rotated at a prescribed rotational frequency for casting the liquid mixture into the mold 11 through the casting tube 16.

Then, the temperature and the rotational frequency of the mold 11 are managed to prescribed values for pressing the liquid mixture against the inner surface of the mold 11 by centrifugal force and primarily heating and hardening the polymeric material. During this primary heating, bubbles having small specific gravity are removed from the inner peripheral surface of the liquid mixture. The polymeric material already gels into a cylindrical body when the primary heating is ended, and hence no movement of the filler takes place in subsequent steps.

Further, the polymeric material is secondarily heated for improving physical properties of the cylindrical body while managing the temperature and the rotational frequency of the mold 11 to prescribed values.

Then, the mold 11 and the cylindrical body are naturally cooled by stopping rotation of the mold 11 or while keeping the same rotated, and thereafter the cylindrical body is taken out from the mold 11.

The cylindrical body is subjected to tertiary heating at desire, for further improving the physical properties of the cylindrical body.

A removing step is now described.

Removal may be performed by a known method such as cutting or blasting.

Figure 3:
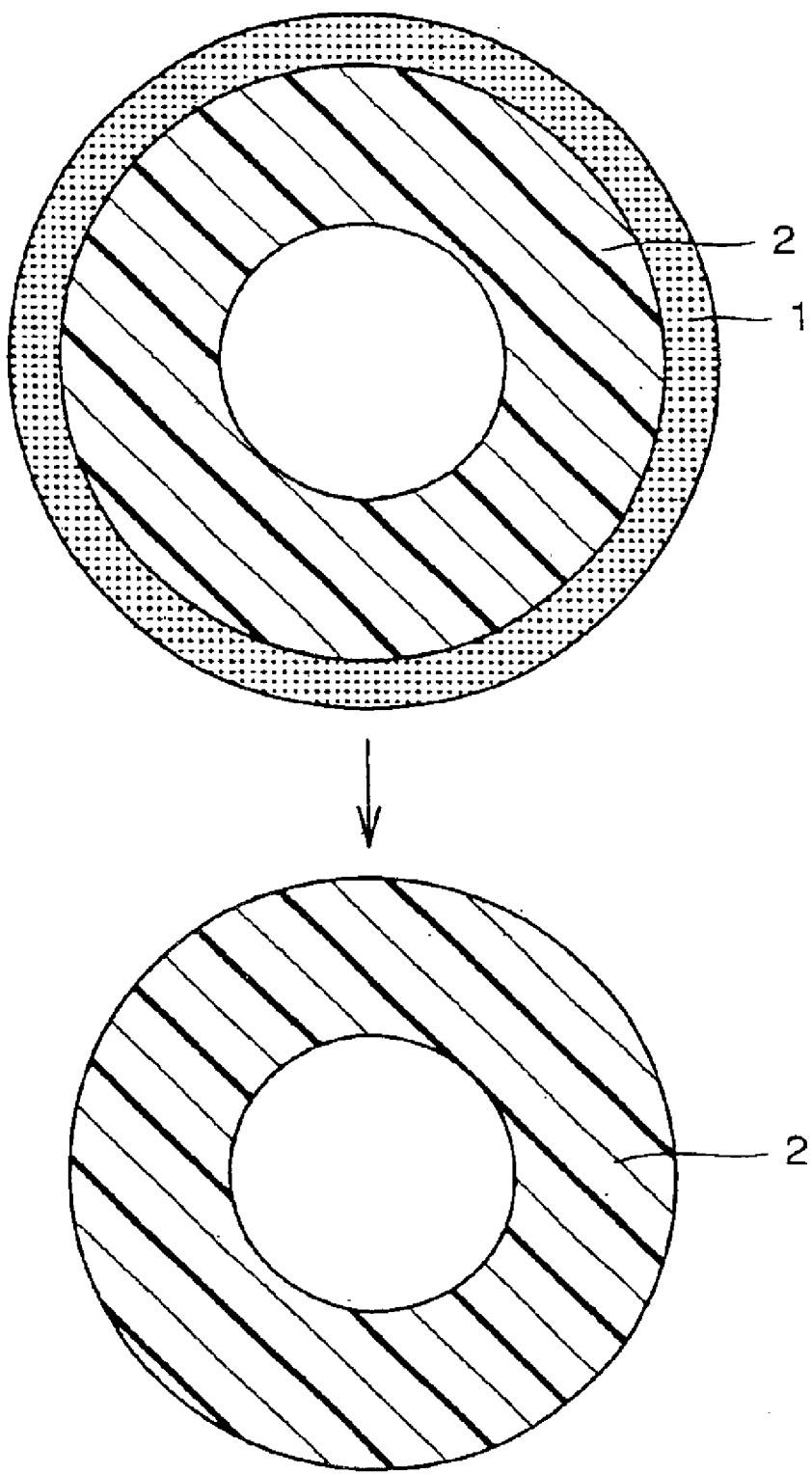
FIG. 3 illustrates a cutting step in the present invention.

Referring to FIG. 3, a high-density packed bed 1 is removed from the cylindrical body obtained by centrifugal molding for exposing the surface of a homogeneous dispersion layer 2, thereby obtaining an elastic cylindrical body having the filler substantially homogeneously dispersed on the whole.

A general filler has larger specific gravity than the liquid polymeric material, and hence the high-density packed bed 1 is formed on the outer peripheral surface side of the homogeneous dispersion layer 2. When a filler such as a hollow glass bead or a hollow resin bead having smaller specific gravity than the liquid polymeric material is employed, on the other hand, the high-density packed bed 1 is formed on the inner peripheral surface side of the homogeneous dispersion layer 2.

The removed amount may be set at least to the thickness corresponding to Z shown in the equation [1].

Figure 4:
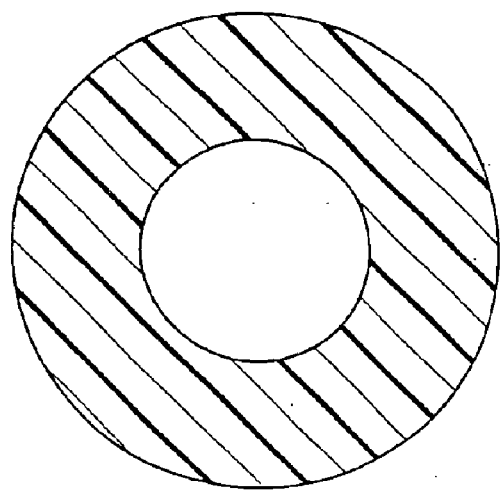
FIG. 4 is a sectional view of an elastic cylindrical body obtained without through a cutting step according to another embodiment of the present invention.

According to the equations [7] to [10], the removing step is unnecessary and an elastic cylindrical body having the filler substantially homogeneously dispersed on the whole can be obtained without forming a high-density packed bed as shown in FIG. 4.

A method of confirming the high-density packed bed is now described.

The thickness of the high-density packed bed can generally be confirmed through an electron micrograph of a section of the cylindrical body.

The thickness can also be confirmed by that, when the hardness or the ash content is measured per prescribed interval (for example, 1 mm) in the thickness direction of the cylindrical body, the measured value absolutely changes on the boundary between the high-density packed bed and the homogeneous dispersion layer.

The manufacturing method according to the present invention is preferable particularly when manufacturing a large-sized roll or a hard elastic roll. Such a roll is a paper calender roll, for example.

Large-sized roll: 300 to 1500 mm in outer diameter, 1500 to 10000 mm in face

Hard elastic roll: D70 to D99 in durometer hardness by JIS K6253

Figure 5A:
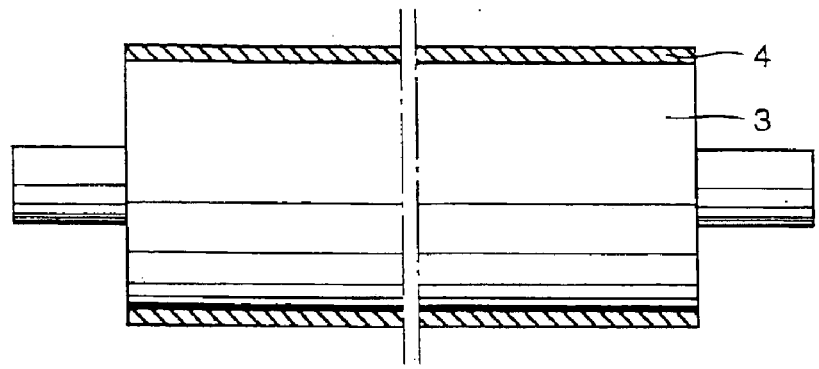
FIGS. 5A to 5C are conceptual diagrams illustrating steps of manufacturing a large-sized roll from the elastic cylindrical body according to the present invention.
Figure 5B:
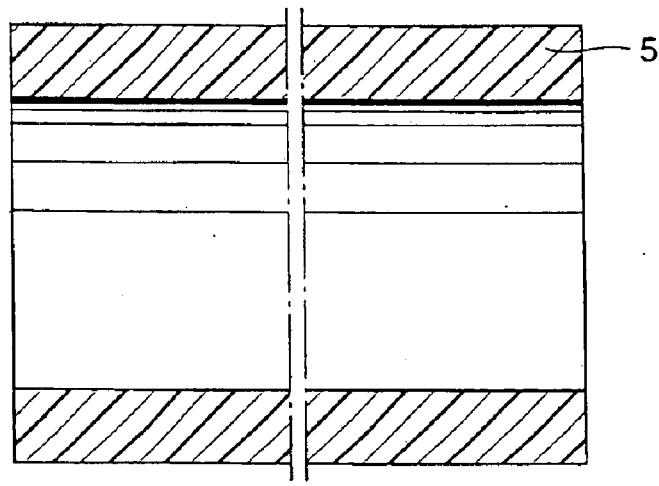
Figure 5C:
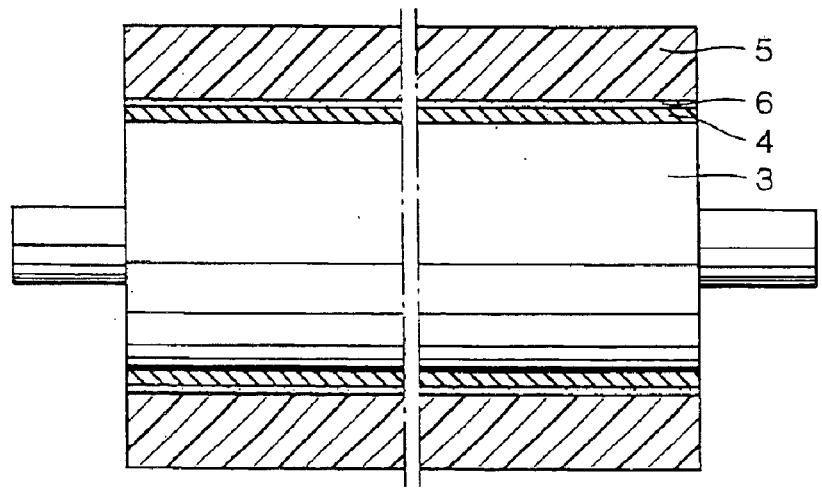

A large-sized roll is manufactured from the elastic cylindrical body according to the present invention along the method described in Japanese Patent Publication No. 3-47359, for example. Referring to FIGS. 5A to 5C, it is possible to engage an outer layer cylinder 5 on a metal roll core 3 having a fiber-reinforced under winding layer 4, cast an adhesive into an annular clearance defined between the under winding layer 4 and the cylindrical body 5, harden the same at a prescribed temperature and join/integrate the under winding layer 4 and the cylindrical body 5 with each other through an adhesive layer 6.

Miniature samples 1 to 11 were prepared through the following procedures, for making experiments.

Sample 1

100 parts by weight of bisphenol A epoxy resin (epoxy equivalent: 180 to 200 g/eq), 27.0 parts by weight of a hardener (modified aromatic polyamine, amine equivalent: 50 to 70 g/eq) and 38.5 parts by weight of silica (80 cumulative weight % particle diameter: 4.5 µm) were mixed with each other and stirred for preparing a liquid mixture. A mold having an inner radius of 130 mm and an inner face length of 345 mm was prepared for centrifugal molding. This mold was heated to a bulk temperature of 70° C. and rotated at a rotational frequency of 1000 rpm for casting the liquid mixture into the mold from a casting machine. Primary heating was performed through a step A of removing voids by relatively high-speed rotation and a step B of hardening the polymeric material while suppressing radial movement of the filler by relatively low-speed rotation. In other words, the internal temperature of the mold was kept at 70° C. for performing primary heating at 1000 rpm for one hour up to 3600 seconds from starting casting (step A) and at a reduced rotational frequency of 300 rpm for subsequent three hours from 3600 seconds up to 14400 seconds (step B). Then, the internal temperature of the mold was set to 120° C. for performing secondary heating at a rotational frequency of 300 rpm for two hours from 14400 seconds up to 21600 seconds. Then, the inner part of the mold was naturally cooled while keeping the rotational frequency of 300 rpm, and the cylindrical body was thereafter taken out from the mold.

Table 1 describes the thickness (T) of the cylindrical body, the specific gravity ($\rho p$) of the filler, the specific gravity ($\rho$) of the resin, the specific gravity ($\rho M$) of the liquid mixture and the inner radius (r) of the cylindrical body.

TABLE 1

| | | | sample 1 | sample 2 | sample 3 | sample 4 |
|---|---|---|---|---|---|---|
| composition | resin | epoxy | (1) | (2) | (1) | (2) |
| | | parts by weight | 100.0 | 100.0 | 100.0 | 100.0 |
| | filler | silica | (6) | (6) | (7) | (7) |
| | | parts by weight | 38.5 | 65.8 | 45.3 | 65.8 |
| | hardener | | (4) | (5) | (4) | (5) |
| | | parts by weight | 27.0 | 38.0 | 27.0 | 38.0 |
| molding condition | primary heating temperature (° C.) | | 70 | 60 | 70 | 60 |
| | N: rotational frequency (rpm) | | A step | A step | A step | A step |
| | t: time (sec) | | 1000 | 1000 | 1000 | 1000 |
| | | | 0–3600 | 0–3600 | 0–3600 | 0–3600 |

TABLE 1-continued

|  | | sample 1 | sample 2 | sample 3 | sample 4 |
|---|---|---|---|---|---|
| | N: rotational frequency (rpm) | B step | B step | B step | B step |
| | t: time (sec) | 300 | 300 | 300 | 300 |
| | | 3600–14400 | 3600–14400 | 3600–14400 | 3600–14400 |
| | secondary heating temperature (° C.) | 120 | 120 | 120 | 120 |
| | N: rotational frequency (rpm) | 300 | 300 | 300 | 300 |
| | t: time (sec) | 14400–21600 | 14400–21600 | 14400–21600 | 14400–21600 |
| | $t_{gp}$: gel point (sec) | 8020 | 6040 | 8020 | 6040 |
| T: thickness of cylindrical body (mm) | | 25 | 22 | 25 | 40 |
| thickness of high-density packed bed h (mm) | | 3.0 | 0.23 | 0.36 | 0.05 |
| h/T (%) | | 12.00 | 1.05 | 1.44 | 0.13 |
| R: inner radius of mold (mm) | | 130 | 130 | 130 | 178 |
| $D_p$: 80 cumulative weight % particle diameter (μm) | | 4.5 | 4.5 | 1.8 | 1.8 |
| $ρ_p$: specific gravity of filler | | 2.65 | 2.65 | 2.65 | 2.65 |
| ρ: specific gravity of resin | | 1.1 | 1.1 | 1.1 | 1.1 |
| $ρ_m$: specific gravity of liquid mixture | | 1.4 | 1.4 | 1.4 | 1.4 |
| r: inner radius of cylindrical body (mm) | | 105 | 108 | 105 | 138 |
| X: calculated value (mm) | | 1991 | 172 | 1991 | 235 |
| X ≧ T | | ○ | ○ | ○ | ○ |
| Y calculated value (mm) | | 5.63 | 0.53 | 0.90 | 0.13 |
| Z = 1.1 × Y (mm) | | 6.19 | 0.58 | 0.99 | 0.14 |
| ratio of Y to T | | 0.225 | 0.024 | 0.036 | 0.003 |
| hardness of outer surface (JISD) | | 92 | 93 | 91 | 93 |
| difference in hardness between inner and outer surfaces | | 1 | 0 | 0 | 0 |
| difference in hardness per mm (max) | | 0 | 0 | 0 | 0 |
| difference in ash content % between inner and outer surfaces | | 1.1 | 4.5 | 0 | 0 |
| difference in ash content % per mm (max) | | 0.5 | 0.19 | 0 | 0 |
| presence/absence of voids | | none | none | none | none |
| total evaluation | | ○ | ○ | ⊙ | ⊙ |

TABLE 2

|  | | | sample 5 | sample 6 | sample 7 | sample 8 |
|---|---|---|---|---|---|---|
| composition | resin | epoxy | (3) | (3) | (3) | (3) |
| | | parts by weight | 100.0 | 100.0 | 100.0 | 100.0 |
| | filler | silica | (6) | (6) | (6) | (7) |
| | | parts by weight | 37.6 | 37.6 | 37.6 | 36.7 |
| | hardener | | (4) | (4) | (4) | (4) |
| | | parts by weight | 24.0 | 24.0 | 24.0 | 24.0 |
| molding condition | primary heating temperature (° C.) | | 60 | 60 | 60 | 60 |
| | | | | | | A step |
| | N: rotational frequency (rpm) | | 400 | 300 | 200 | 1000 |
| | t: time (sec) | | 0–14400 | 0–14400 | 0–14400 | 0–2700 |
| | | | | | | B step |
| | N: rotational frequency (rpm) | | | | | 300 |
| | t: time (sec) | | | | | 2700–14400 |
| | secondary heating temperature (° C.) | | 120 | 120 | 120 | 120 |
| | N: rotational frequency (rpm) | | 400 | 300 | 200 | 300 |
| | t: time (sec) | | 14400–21600 | 14400–21600 | 14400–21600 | 14400–21600 |
| | $t_{gp}$: gel point (sec) | | 6080 | 6080 | 6080 | 6080 |
| T: thickness of cylindrical body (mm) | | | 30 | 30 | 30 | 26 |
| thickness of high-density packed bed h (mm) | | | 0.07 | — | — | 0.05 |
| h/T (%) | | | 0.23 | — | — | 0.19 |
| R: inner radius of mold (mm) | | | 130 | 130 | 130 | 130 |
| $D_p$: 80 cumulative weight % particle diameter (μm) | | | 4.5 | 4.5 | 4.5 | 1.8 |
| $ρ_p$: specific gravity of filler | | | 2.65 | 2.65 | 2.65 | 2.65 |
| ρ: specific gravity of resin | | | 1.1 | 1.1 | 1.1 | 1.1 |
| $ρ_m$: specific gravity of liquid mixture | | | 1.4 | 1.4 | 1.4 | 1.4 |
| r: inner radius of cylindrical body (mm) | | | 100 | 100 | 100 | 104 |
| X: calculated value (mm) | | | 40.9 | 23 | 10.2 | 177 |
| X ≧ T | | | ○ | X | X | ○ |
| Y calculated value (mm) | | | 0.18 | 0.10 | 0.04 | 0.12 |
| Z = 1.1 × Y (mm) | | | 0.20 | 0.11 | 0.04 | 0.13 |
| ratio of Y to T | | | 0.006 | 0.003 | 0.001 | 0.005 |
| hardness of outer surface (JISD) | | | 92 | — | — | 92 |
| difference in hardness between inner and outer surfaces | | | 0 | — | — | 0 |
| difference in hardness per mm (max) | | | 0 | — | — | 0 |
| difference in ash content % between inner and outer surfaces | | | 0 | — | — | 0 |
| difference in ash content % per mm (max) | | | 0 | — | — | 0 |

TABLE 2-continued

|  | sample 5 | sample 6 | sample 7 | sample 8 |
|---|---|---|---|---|
| presence/absence of voids | none | yes | yes | none |
| total evaluation | ◎ | X | X | ◎ |

TABLE 3

|  |  |  | sample 9 | sample 10 | sample 11 |
|---|---|---|---|---|---|
| composition | resin | epoxy | (3) | (3) | (3) |
|  |  | parts by weight | 100.0 | 100.0 | 100.0 |
|  | filler | silica | (7) | (8) | (9) |
|  |  | parts by weight | 37.6 | 37.6 | 37.6 |
|  | hardener |  | (4) | (4) | (4) |
|  |  | parts by weight | 24.0 | 24.0 | 24.0 |
| molding condition |  | primary heating temperature (° C.) | 60 | 60 | 60 |
|  |  |  |  | A step | A step |
|  |  | N: rotational frequency (rpm) | 400 | 1000 | 1000 |
|  |  | t: time (sec) | 0–14400 | 0–2700 | 0–2700 |
|  |  |  |  | B step | B step |
|  |  | N: rotational frequency (rpm) |  | 300 | 300 |
|  |  | t: time (sec) |  | 2700–14400 | 2700–14400 |
|  |  | secondary heating temperature (° C.) | 120 | 120 | 120 |
|  |  | N: rotational frequency (rpm) | 400 | 300 | 300 |
|  |  | t: time (sec) | 14400–21600 | 14400–21600 | 14400–21600 |
|  |  | $t_{gp}$: gel point (sec) | 6080 | 8030 | 8080 |
| T: thickness of cylindrical body (mm) |  |  | 30 | 25 | 25 |
| thickness of high-density packed bed h (mm) |  |  | 0.03 | 4.2 | 5.5 |
| h/T (%) |  |  | 0.10 | 16.80 | 22.00 |
| R: inner radius of mold (mm) |  |  | 130 | 130 | 130 |
| $D_p$: 80 cumulative weight % particle diameter (μm) |  |  | 1.8 | 23 | 51 |
| $ρ_p$: specific gravity of filler |  |  | 2.65 | 2.65 | 2.65 |
| ρ: specific gravity of resin |  |  | 1.1 | 1.1 | 1.1 |
| $ρ_m$: specific gravity of liquid mixture |  |  | 1.4 | 1.4 | 1.4 |
| r: inner radius of cylindrical body (mm) |  |  | 100 | 105 | 105 |
| X: calculated value (mm) |  |  | 40.9 | 294 | 475 |
| X ≧ T |  |  | ○ | ○ | ○ |
| Y calculated value (mm) |  |  | 0.03 | 21.50 | 105.90 |
| Z = 1.1 × Y (mm) |  |  | 0.03 | 23.65 | 116.49 |
| ratio of Y to T |  |  | 0.001 | 0.860 | 4.236 |
| hardness of outer surface (JISD) |  |  | 92 | 94 | 93 |
| difference in hardness between inner and outer surfaces |  |  | 0 | 6 | 5 |
| difference in hardness per mm (max) |  |  | 0 | 4 | 5 |
| difference in ash content % between inner and outer surfaces |  |  | 0 | 64.5 | 63.8 |
| difference in ash content % per mm (max) |  |  | 0 | 52 | 59 |
| presence/absence of voids |  |  | none | none | none |
| total evaluation |  |  | ◎ | X | X |

(1) bisphenol A epoxy resin (epoxy equivalent: 180 to 200 g/eq)

(2) bisphenol A epoxy resin (epoxy equivalent: 155 to 175 g/eq)

(3) bisphenol A epoxy resin (epoxy equivalent: 220 to 240 g/eq)

(4) modified aromatic polyamine (amine equivalent: 50 to 70 g/eq)

(5) modified aromatic polyamine (amine equivalent: 60 to 80 g/eq)

(6) silica (80 cumulative weight % particle diameter: 4.5 μm)

(7) silica (80 cumulative weight % particle diameter: 1.8 μm)

(8) silica (80 cumulative weight % particle diameter: 23 μm)

(9) silica (80 cumulative weight % particle diameter: 51 μm)

When these centrifugal molding conditions are applied to the equation [5], the value of X reaches 1991 mm. When these conditions are applied to the equation [6], the value of Y reaches 5.63 mm.

When a section obtained by vertically cutting the prepared cylindrical body with respect to the axis was observed through an electron micrograph, it was possible to confirm that a 3.0 mm thickness of high-density packed bed densely filled with the filler was formed on the outer peripheral surface of the cylindrical body.

Figure 6:
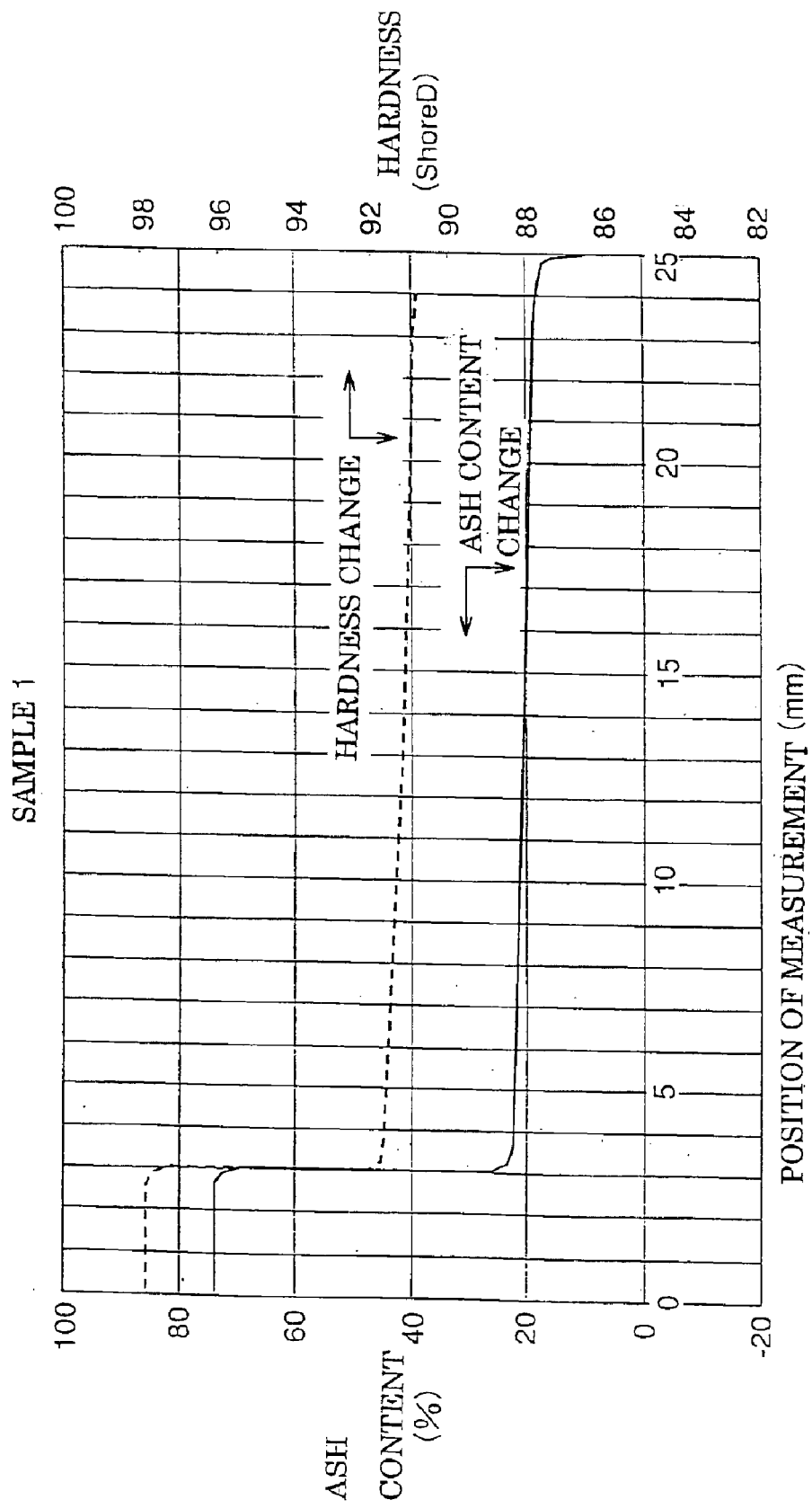
FIG. 6 illustrates the relation between a position of measurement for a sample 1 and an ash content as well as hardness.
Figure 7:
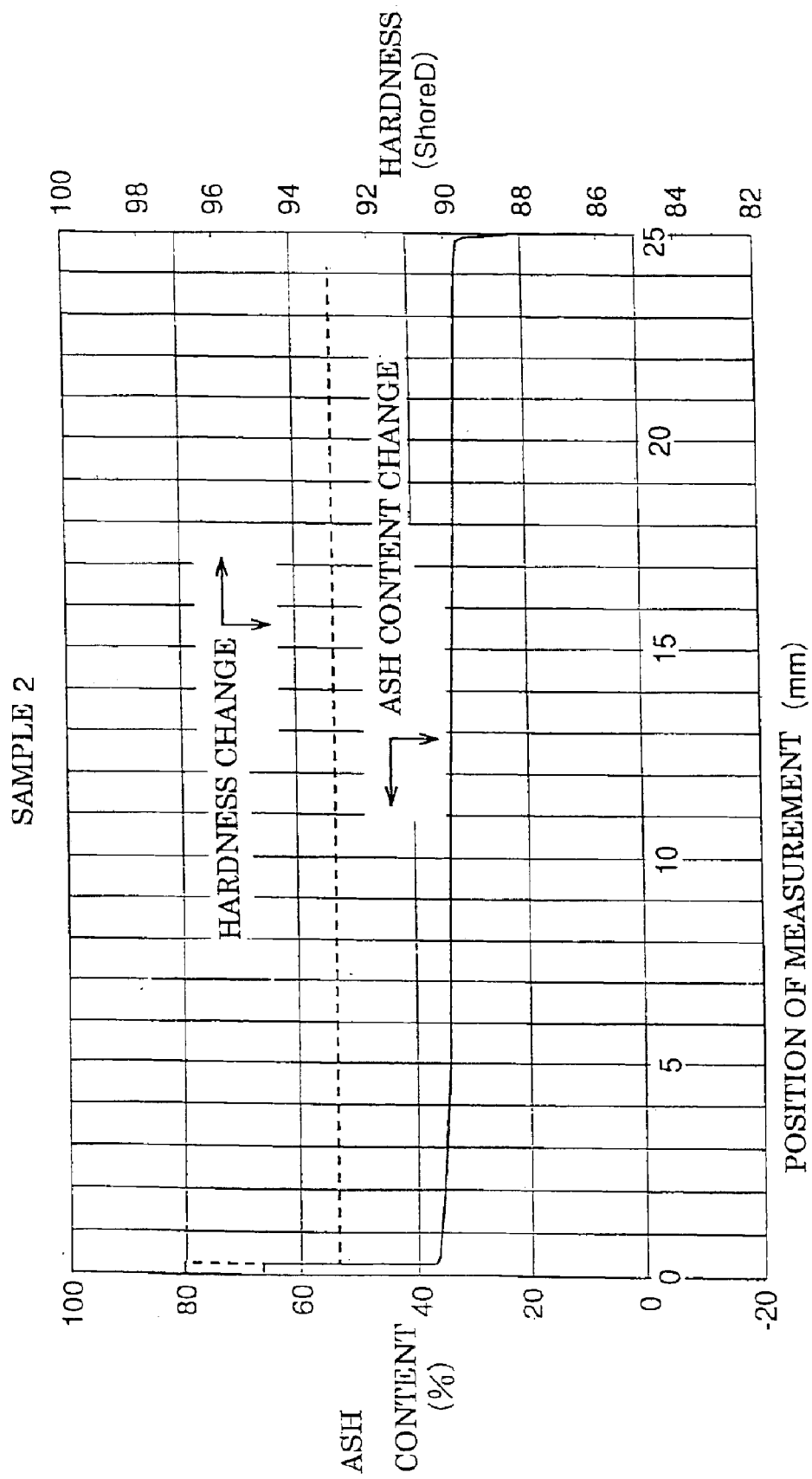
FIG. 7 illustrates the relation between a position of measurement for a sample 2 and an ash content as well as hardness.
Figure 8:
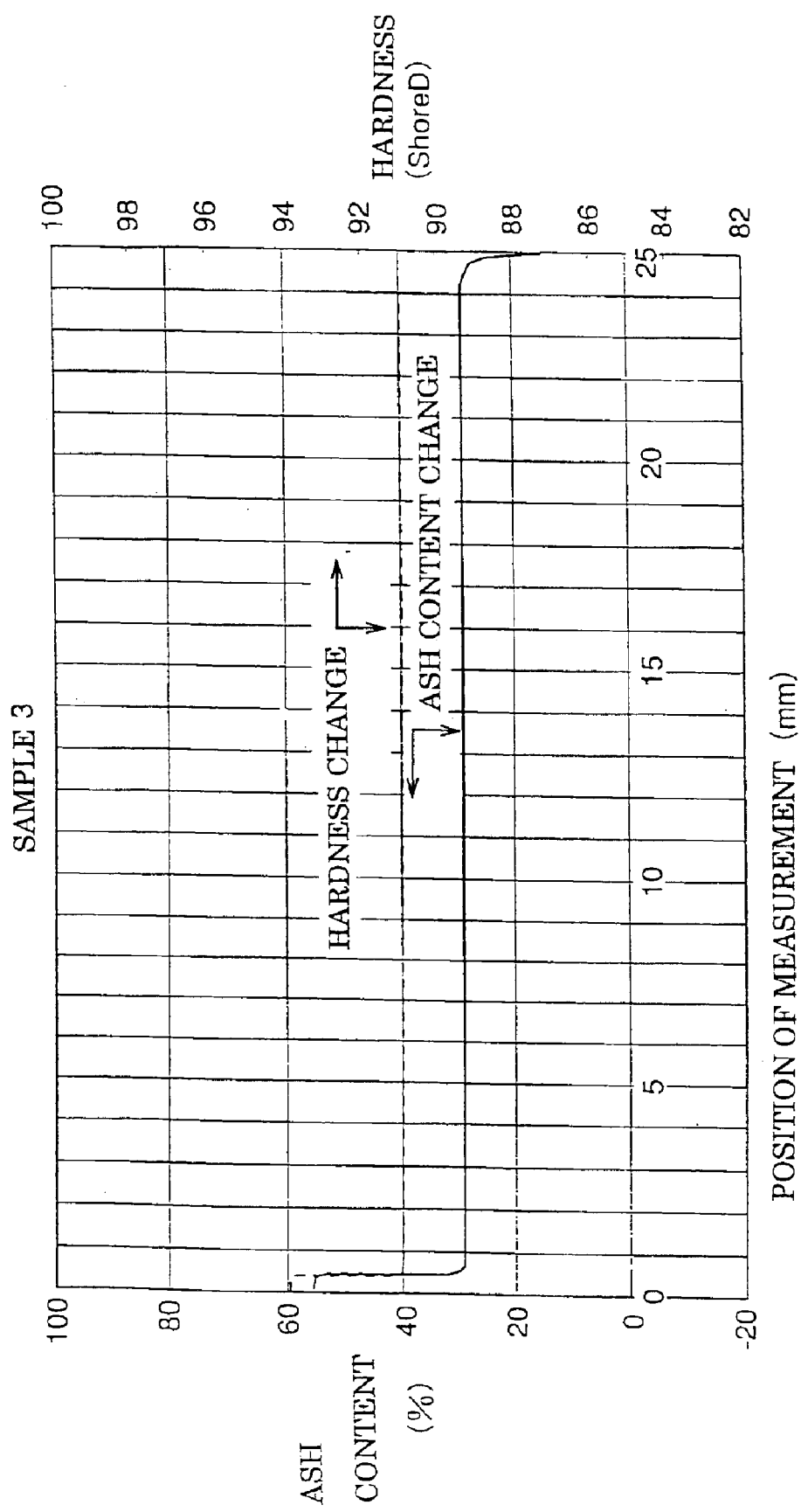
FIG. 8 illustrates the relation between a position of measurement for a sample 3 and an ash content as well as hardness.
Figure 9:
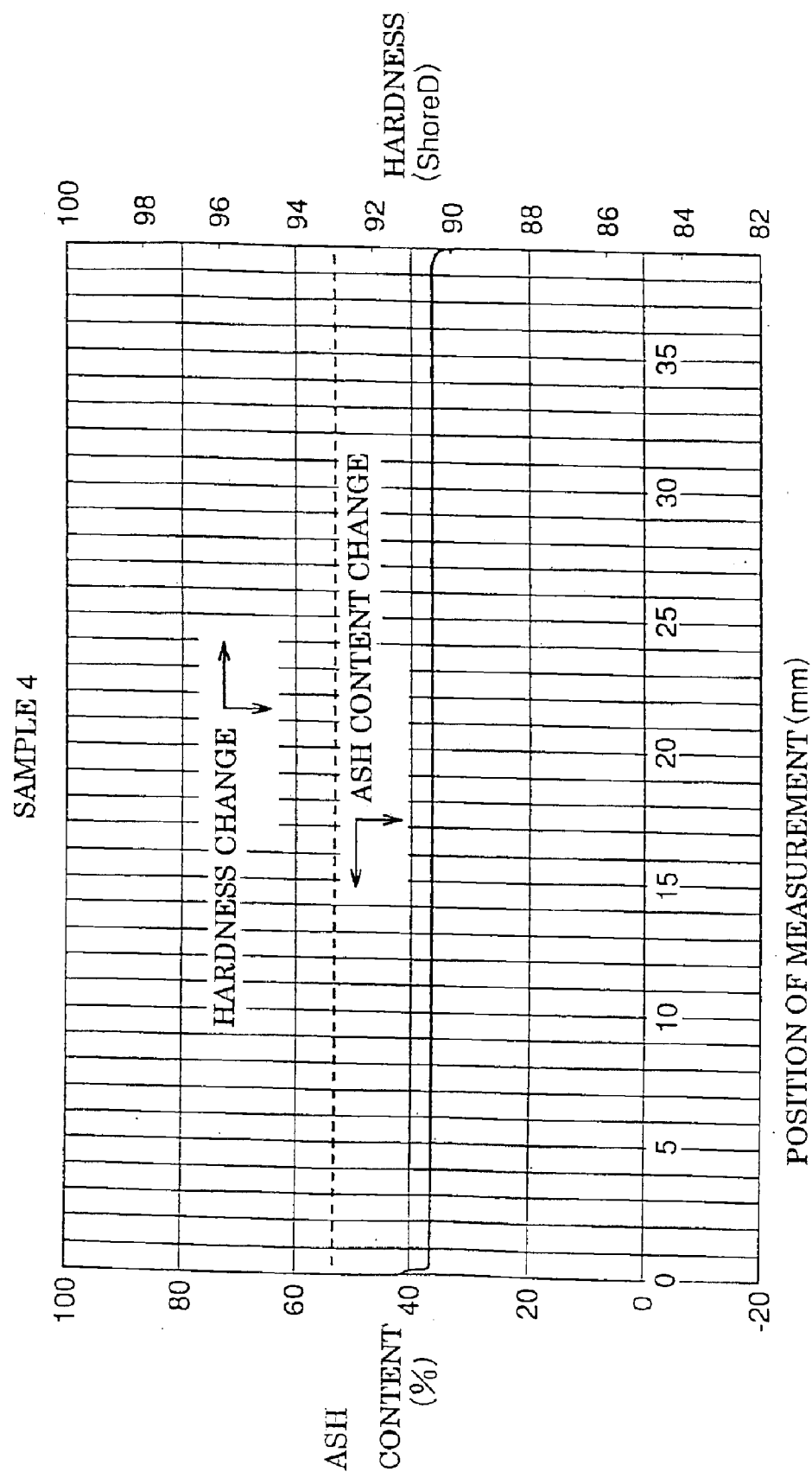
FIG. 9 illustrates the relation between a position of measurement for a sample 4 and an ash content as well as hardness.
Figure 10:
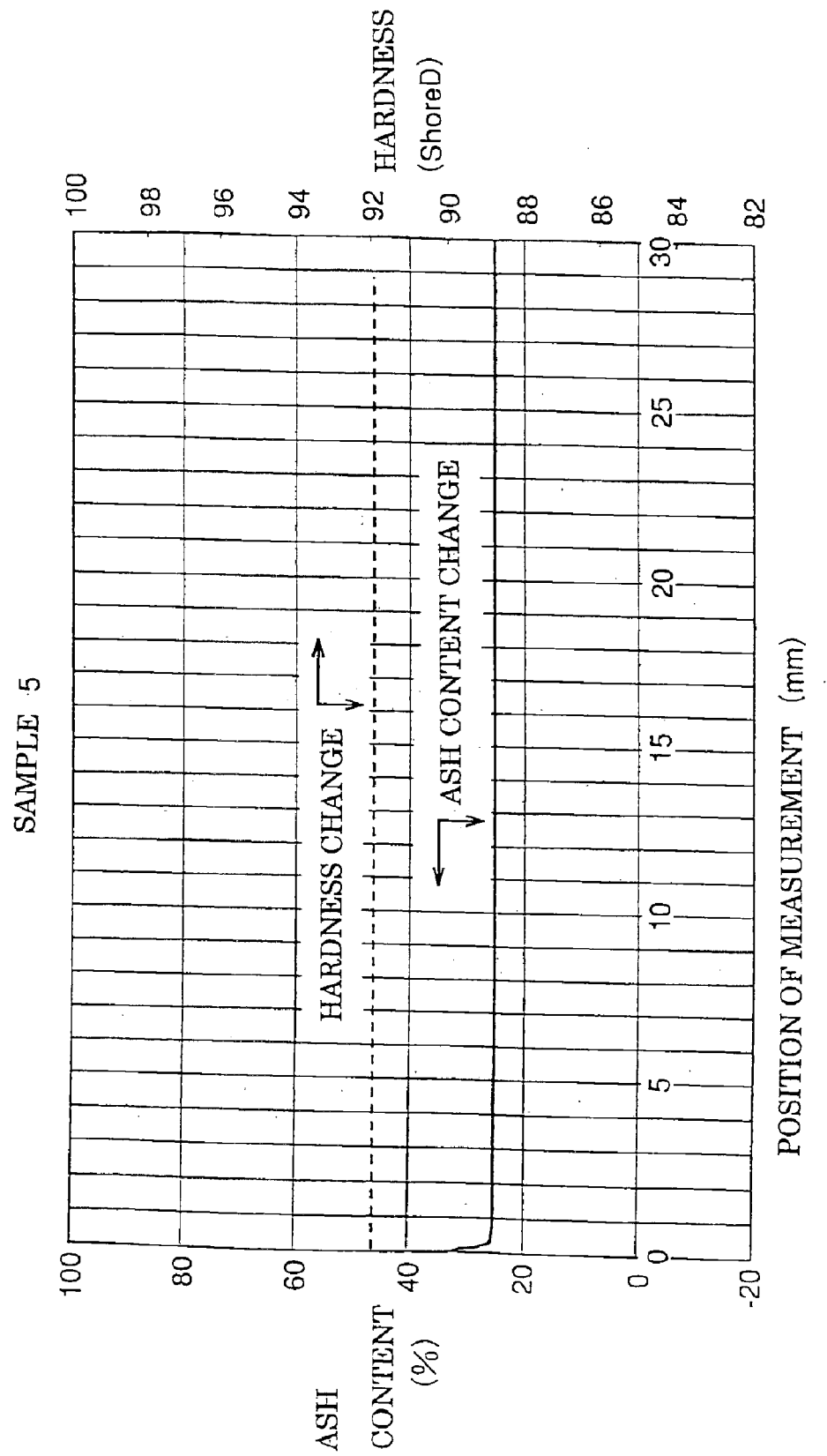
FIG. 10 illustrates the relation between a position of measurement for a sample 5 and an ash content as well as hardness.
Figure 11:
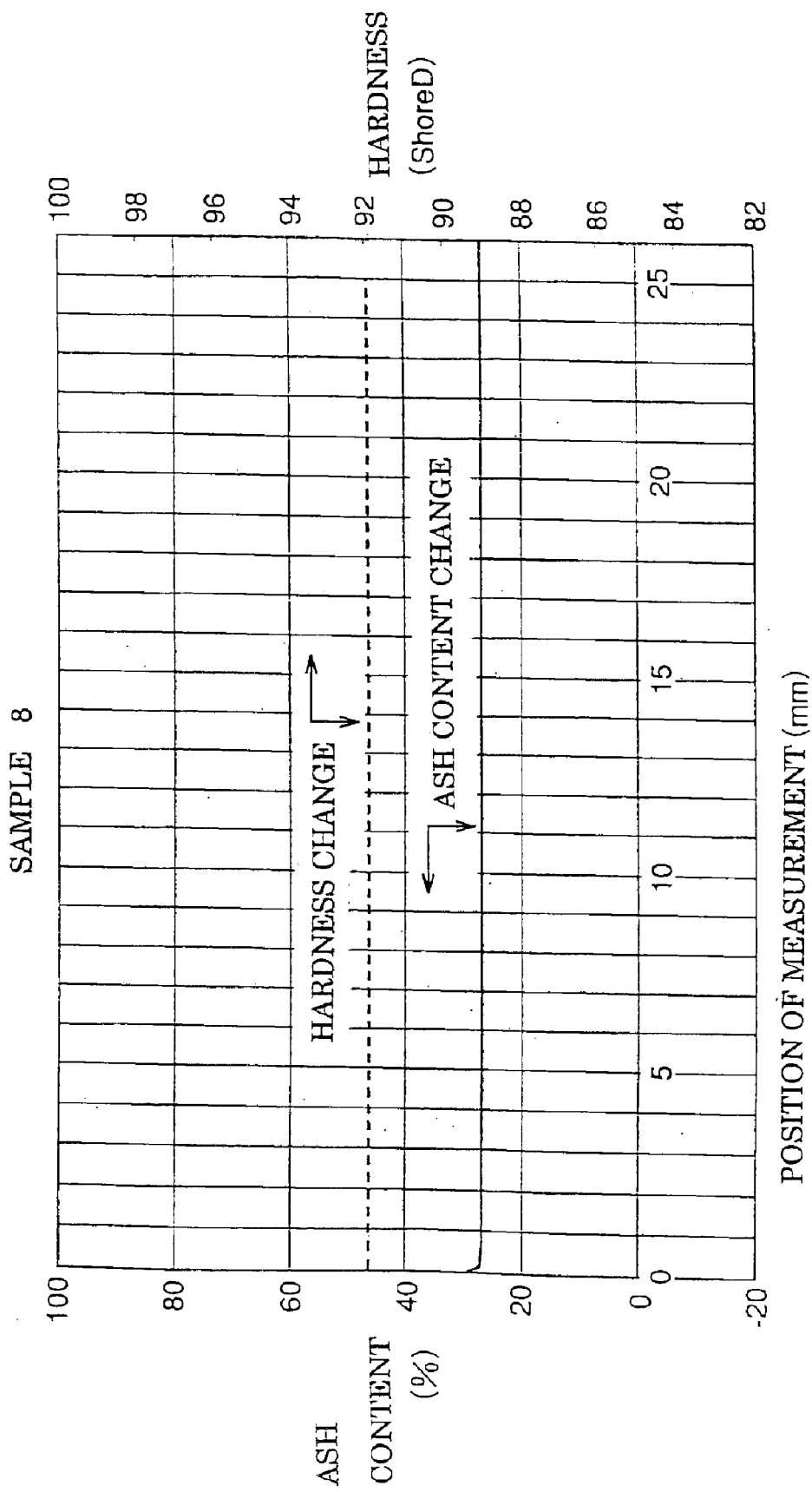
FIG. 11 illustrates the relation between a position of measurement for a sample 8 and an ash content as well as hardness.
Figure 12:
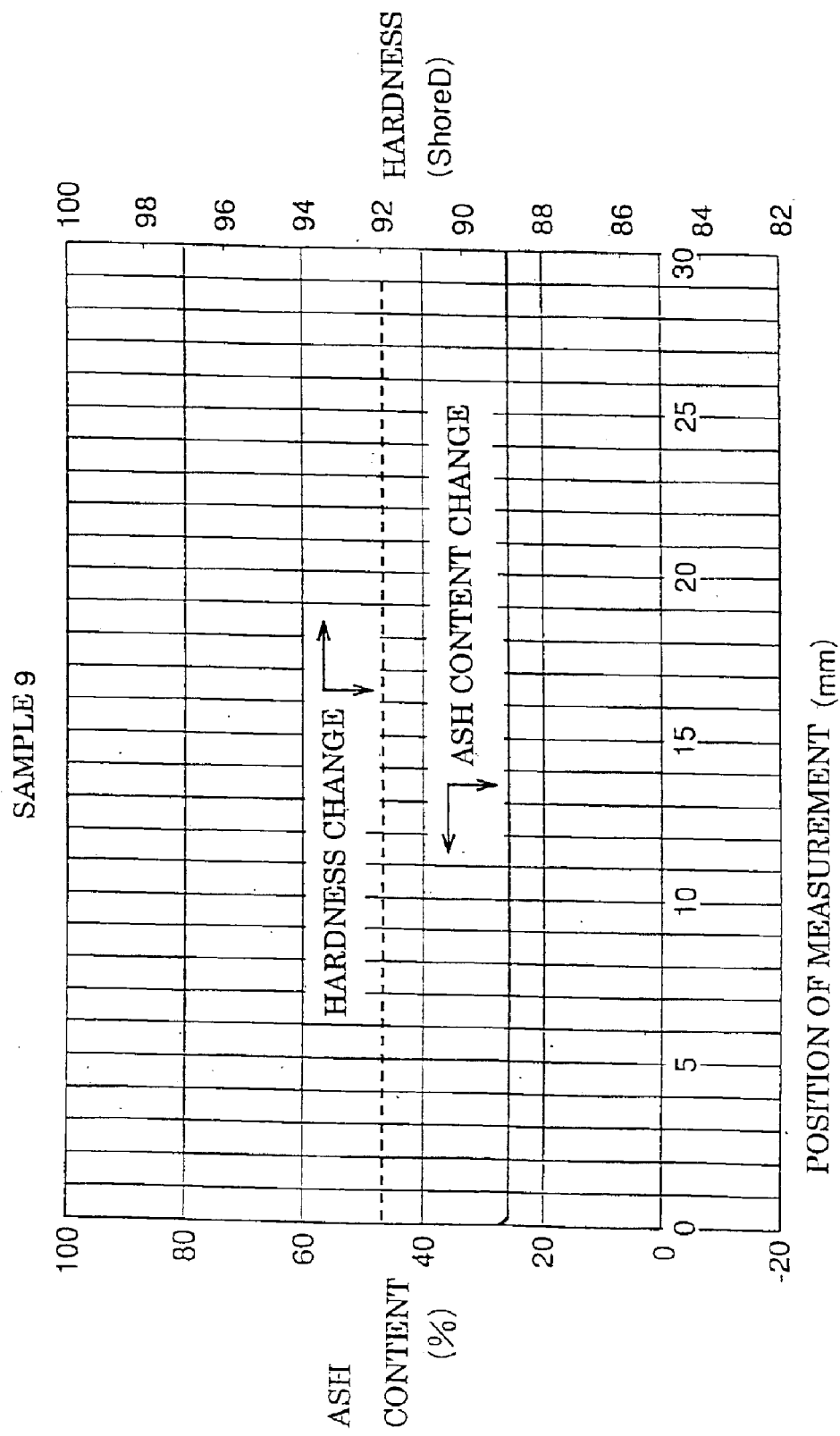
FIG. 12 illustrates the relation between a position of measurement for a sample 9 and an ash content as well as hardness.
Figure 13:
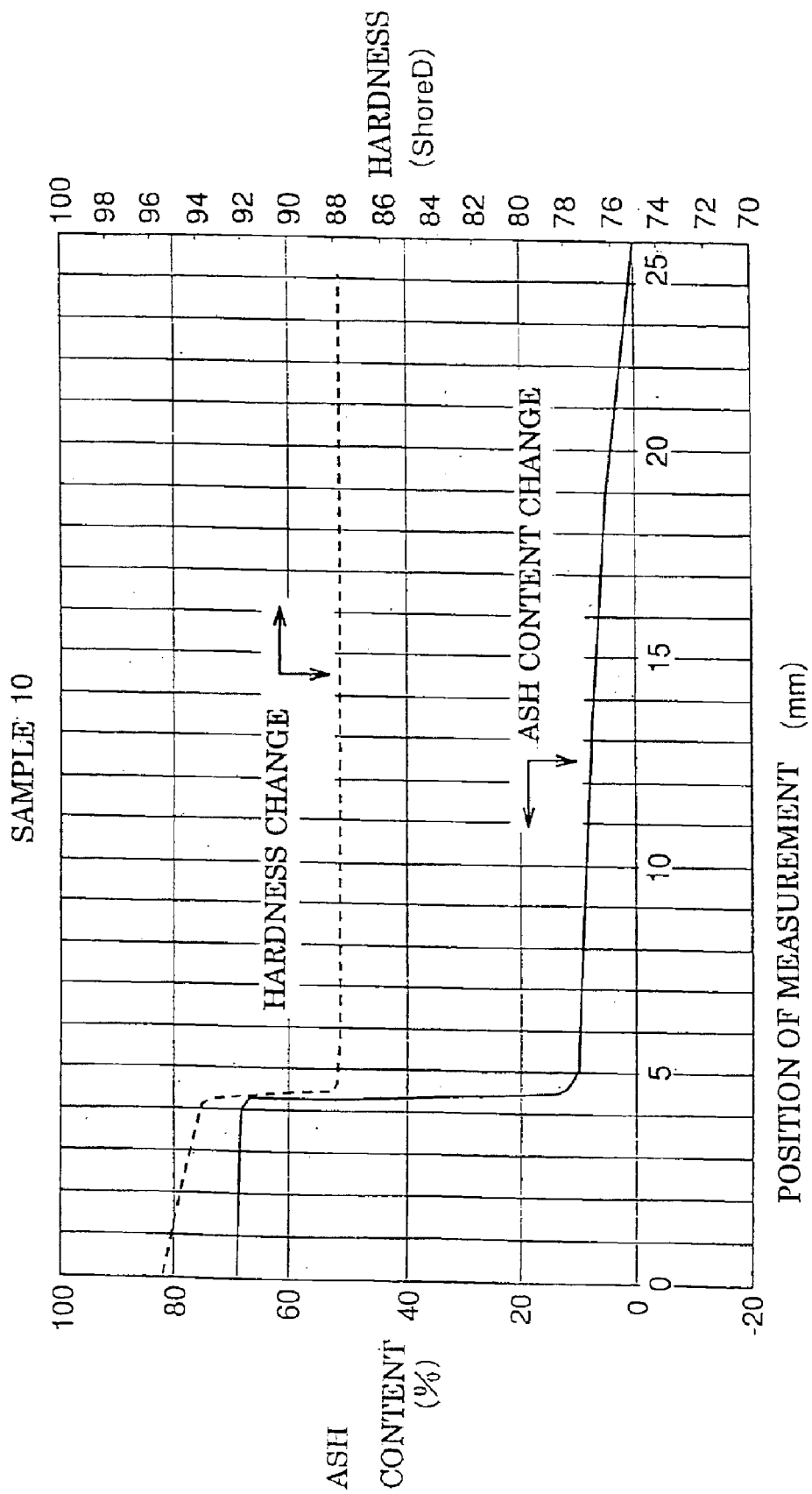
FIG. 13 illustrates the relation between a position of measurement for a sample 10 and an ash content as well as hardness.

The hardness (type D durometer hardness defined in JIS K6253) and the ash content (%) (name of measuring apparatus: "TG/DTA 220" by Seiko Instruments Inc.) were measured per millimeter from the outer peripheral surface of the cylindrical body. A graph of FIG. 6 shows the results of measurement.

While the outer peripheral surface of the cylindrical body was cut toward the axial direction for visually confirming presence/absence of voids per thickness of 1 mm, no voids were discovered on the surface and in the inner part of the cylindrical body.

Samples 2 to 11

The respective samples were prepared under conditions shown in Tables 1, 2 and 3 similarly to the sample 1.

As to the samples 5 to 7 and 9, primary heating was performed while keeping the rotational frequency of the mold constant.

Evaluation

1. Presence/Absence of Voids

When presence/absence of voids on the surfaces and in the inner parts of the cylindrical bodies was investigated, no voids were discovered on the surfaces and in the inner parts of the cylindrical bodies as to the samples 1 to 5 and 8 to 11. On the other hand, large numbers of voids of about 0.2 mm in diameter were discovered in the inner parts of the cylindrical bodies of the samples 6 and 7 not satisfying the equation [3], and the requirements of the present invention were not satisfied.

2. Thickness of High-Density Packed Bed

As to the samples 1 to 5 and 8 to 11 exhibiting no voids, the thicknesses of the high-density packed beds were investigated. Ratios (h/T) of the thicknesses h of the high-density packed beds to the thicknesses T of the overall cylindrical bodies calculated on the basis of results of observation through electron micrographs were not more than 15% in the samples 1 to 5, 8 and 9, and hence improvement of the yield can be expected by reducing the amount to be removed as compared with a conventional manufacturing method employing no centrifugal molding. In particular, the ratios were not more than 2% in the samples 2 to 5, 8 and 9, and a large effect of improving the yield can be attained. On the other hand, the ratios exceeded 15% in the samples 10 and 11 not satisfying the equation [4], and hence no improvement of the yield can be expected.

3. Homogeneity of Elastic Cylindrical Body

As to each sample, Tables 1–3 also show the hardness of the outer surface, the difference between the hardness of the outer surface and the hardness of the inner surface and the maximum difference in hardness per millimeter in the thickness direction as well as the difference between the ash content (%) on the outer surface portion and the ash content (%) on the inner surface portion and the maximum difference in ash content (%) per millimeter in the thickness direction measured when removing the outer peripheral surface by the thickness of the high-density packed bed and removing the inner peripheral surface by a thickness of 0.5 mm for improving surface accuracy. When the thickness of the high-density packed bed was in excess of 15% of the thickness of the overall cylindrical body (samples 10 and 11), no portion was removed in excess of 15% of the thickness of the overall cylindrical body.

It is understood that the fillers are substantially homogeneously dispersed in the obtained elastic cylindrical bodies on the whole in the samples 1 to 9. In particular, it is understood that the samples 3 to 5, 8 and 9 have substantially no differences in hardness and ash content (%) in the thickness directions. In the samples 10 and 11, on the other hand, the ratios of dispersion of the fillers are heterogeneous in the thickness directions also when portions of 15% of the thicknesses of the overall cylindrical bodies are removed.

FIGS. 6 to 14 show the relations between positions of measurement, ash contents and hardness values of the samples 1 to 11 (excluding samples 6 and 7). The positions of measurement of 0 mm show the outer surfaces of the high-density packed beds.

4. Total Evaluation

It was possible to remove voids and set the thicknesses of the high-density packed beds to not more than 15% of the thicknesses of the cylindrical bodies prepared through centrifugal molding steps in the samples 1 to 5, 8 and 9 satisfying the equations [3] and [4]. Particularly in the samples 4, 5, 8 and 9 satisfying the equations [7] and [8], it was possible to remove voids and convert the high-density packed beds to extremely small skin layers of not more than 1% of the thicknesses of the cylindrical bodies prepared through the centrifugal molding steps.

Tables 1–3 show total evaluation with ⊚, ○ and X.

⊚ . . . particularly excellent

○ . . . usable

X . . . unusable

According to the method of manufacturing an elastic cylindrical body and the method of manufacturing an elastic roll according to the present invention, as hereinabove described, the yield is improved. Further, it is possible to remove voids and stabilize a physical property such as hardness. In addition, it is possible to prevent local stress concentration and internal heat build-up, thereby improving durability.

What is claimed is:

1. A method of manufacturing an elastic cylindrical body, which comprises casting a liquid mixture containing a liquid polymeric material and a filler into a mold for centrifugal molding and centrifugally molding the liquid mixture, thereby preparing a cylindrical body containing a homogeneous dispersion layer having said filler homogeneously dispersed in the polymeric material and a high-density packed bed formed on the outer peripheral surface side or on the inner peripheral surface side of said homogeneous dispersion layer containing said polymeric material more densely filled with said filler; and removing said high-density packed bed and exposing the surface of said homogeneous dispersion layer.

2. The method of manufacturing an elastic cylindrical body according to claim 1, wherein the thickness of said high-density packed bed is greater than 0% and not more than 15% of the thickness of said cylindrical body.

3. The method of manufacturing an elastic cylindrical body according to claim 1, wherein said removing step removes the outer peripheral surface or the inner peripheral surface of said cylindrical body at least by a thickness corresponding to Z expressed in the following equation [1]:

$$Z = 1.1 \times Y \quad [1]$$

$$Y = 6.1 \times 10^{-7} \int_{t_0}^{t_{gp}} \frac{D_P^2 (\rho_P - \rho) r N_t^2}{\mu_t} dt \quad [2]$$

(in the above equations, t0=0, tgp (s) represents the time required for gelation of said liquid mixture, Dp (mm) represents the 80 cumulative weight % particle diameter of said filler, ρp represents the specific gravity of said filler, ρ represents the specific gravity of said liquid polymeric material, r (mm) represents the inner radius of said cylindrical body, Nt (rpm) represents the rotational frequency of said mold at a time t in said centrifugal molding step, and μt (Pa·s) represents the viscosity of said liquid polymeric material at the time t upon heating under the same condition as said centrifugal molding respectively).

4. The method of manufacturing an elastic cylindrical body according to claim 1, said centrifugal molding is performed under conditions satisfying the following equations [3] and [4]:

$$X \geq T \quad [3]$$

$$Y \leq T/4 \quad [4]$$

where $$X = 2.3 \times 10^{-7} \int_{t_0}^{t_{gp}} \frac{0.2^2 \rho_m R N_t^2}{\eta_t} dt \quad [5]$$

$$Y = 6.1 \times 10^{-7} \int_{t_0}^{t_{gp}} \frac{D_P^2 (\rho_P - \rho) r N_t^2}{\mu_t} dt \quad [6]$$

(in the above equations, T (mm) represents the thickness of said cylindrical body, t0=0, tgp (s) represents the time required for gelation of said liquid mixture, ρm represents the specific gravity of said liquid mixture, R (mm) represents the inner radius of said mold, Nt (rpm) represents the rotational frequency of said mold at a time t, in said centrifugal molding step, ηt (Pa·s) represents the viscosity of said liquid mixture at the time t, Dp (mm) represents the 80 cumulative weight % particle diameter of said filler, ρp represents the specific gravity of said filler, ρ represents the specific gravity of said liquid polymeric material, r (mm) represents the inner radius of said cylindrical body, and μt (Pa·s) represents the viscosity of said liquid polymeric material at the time t upon heating under the same condition as said centrifugal molding respectively).

5. The method of manufacturing an elastic cylindrical body according to claim 1, wherein the 80 cumulative weight % particle diameter [Dp] of said filler is in the range of 0.01 μm to 20 μm.

6. The method of manufacturing an elastic cylindrical body according to claim 1, wherein said centrifugal molding step at least includes:

a step A of removing voids from said liquid polymeric material, and a step B of hardening said polymeric material while suppressing radial movement of said filler.

7. The method of manufacturing an elastic cylindrical body according to claim 6, wherein step B is carried out with a lower-speed rotation than step A.

8. The method of manufacturing an elastic cylindrical body according to claim 1, wherein the rotational frequency of said mold is maintained constant throughout said centrifugal molding step.

9. A method of manufacturing an elastic cylindrical body by casting a liquid mixture containing a liquid polymeric material and a filler into a mold and centrifugally molding the liquid mixture thereby preparing a cylindrical body having said filler dispersed in the polymeric material, which comprises performing said centrifugal molding under conditions satisfying the following equations [7] and [8], and;

removing a skin layer, when a high-density packed bed is formed on said cylindrical body as said skin layer:

$$X \geq T \quad [7]$$

$$Y \leq T/100 \quad [8]$$

where $$X = 2.3 \times 10^{-7} \int_{t_0}^{t_{gp}} \frac{0.2^2 \rho_m R N_t^2}{\eta_t} dt \quad [9]$$

$$Y = 6.1 \times 10^{-7} \int_{t_0}^{t_{gp}} \frac{D_P^2 (\rho_P - \rho) r N_t^2}{\mu_t} dt \quad [10]$$

(in the above equations, T (mm) represents the thickness of said cylindrical body, t0=0, tgp (s) represents the time required for gelation of said liquid mixture, ρm represents the specific gravity of said liquid mixture, R (mm) represents the inner radius of said mold, Nt (rpm) represents the rotational frequency of said mold at a time t in said centrifugal molding step, ηt (Pa·s) represents the viscosity of said liquid mixture at the time t, Dp (mm) represents the 80 cumulative weight % particle diameter of said filler, ρp represents the specific gravity of said filler, ρ represents the specific gravity of said liquid polymeric material, r (mm) represents the inner radius of said cylindrical body, and μt (Pa·s) represents the viscosity of said liquid polymeric material at the time t upon heating under the same condition as said centrifugal molding respectively).

10. A method of manufacturing an elastic roll which comprises casting a liquid mixture containing a liquid polymeric material and a filler into a mold for centrifugal molding and molding the liquid mixture thereby preparing a cylindrical body containing a homogeneous dispersion layer having said filler homogeneously dispersed in the polymeric material and a high-density packed bed formed on the outer peripheral surface side or on the inner peripheral surface side of said homogeneous dispersion layer containing said polymeric material more densely filled with said filler;

removing said high-density packed bed (1) and exposing said the surface of said homogeneous dispersion layer and placing said cylindrical body on the outer side of a core before said removing step or after said removing step for integrating said cylindrical body and said core with each other.

11. The method of manufacturing an elastic roll according to claim 10, wherein said elastic roll is a paper calender roll.

12. A method of manufacturing an elastic roll which comprises casting a liquid mixture containing a liquid polymeric material and a filler into a mold for centrifugal molding and centrifugally molding the liquid mixture thereby preparing a cylindrical body containing said filler dispersed in the polymeric material, placing said cylindrical body on the outer side of a core for integrating said cylindrical body and said core with each other, and performing said centrifugal molding under conditions satisfying the following equations [11] and [12]:

$$X \geq T \quad [11]$$

$$Y \leq T/100 \quad [12]$$

where $$X = 2.3 \times 10^{-7} \int_{t_0}^{t_{gp}} \frac{0.2^2 \rho_m R N_t^2}{\eta_t} dt \quad [13]$$

$$Y = 6.1 \times 10^{-7} \int_{t_0}^{t_{gp}} \frac{D_P^2 (\rho_P - \rho) r N_t^2}{\mu_t} dt \quad [14]$$

(in the above equations, T (mm) represents the thickness of said cylindrical body, t0=0, tgp (s) represents the time required for gelation of said liquid mixture, ρm represents the specific gravity of said liquid mixture, R (mm) represents the inner radius of said mold (11), Nt (rpm) represents the rotational frequency of said mold (11) at a time t in said centrifugal molding step, ηt (Pa·s) represents the viscosity of said liquid mixture at the time t, Dp (mm) represents the 80 cumulative weight % particle diameter of said filler, ρp represents the specific gravity of said filler, ρ represents the specific gravity of said liquid polymeric material, r (mm) represents the inner radius of said cylindrical body, and μt (Pa·s) represents the viscosity of said liquid polymeric material at the time t upon heating under the same condition as said centrifugal molding respectively).

* * * * *